(12) United States Patent
Du et al.

(10) Patent No.: US 12,070,739 B2
(45) Date of Patent: Aug. 27, 2024

(54) LOW PRESSURE HYDROPROCESSING CATALYST

(71) Applicant: ExxonMobil Technology and Engineering Company, Annandale, NJ (US)

(72) Inventors: Yi Du, Coopersburg, PA (US); Bradley D. Wooler, Allentown, PA (US); Christine E. Kliewer, Clinton, NJ (US); Stuart Soled, Pittstown, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 0 days.

(21) Appl. No.: 17/449,464

(22) Filed: Sep. 30, 2021

(65) Prior Publication Data
US 2023/0095045 A1 Mar. 30, 2023

(51) Int. Cl.
*B01J 23/882* (2006.01)
*B01J 21/08* (2006.01)
(Continued)

(52) U.S. Cl.
CPC .......... *B01J 23/882* (2013.01); *B01J 21/08* (2013.01); *B01J 31/0238* (2013.01); *B01J 31/04* (2013.01); *B01J 35/633* (2024.01); *B01J 35/635* (2024.01); *B01J 37/0203* (2013.01); *B01J 37/08* (2013.01); *B01J 37/20* (2013.01); *C10G 45/08* (2013.01); *C10G 2300/202* (2013.01)

(58) Field of Classification Search
CPC ...... B01J 23/882; B01J 21/08; B01J 31/0238; B01J 31/04; B01J 35/1038; B01J 35/1042; B01J 37/0203; B01J 37/08; B01J 37/20; C10G 45/08; C10G 2300/202
See application file for complete search history.

(56) References Cited

U.S. PATENT DOCUMENTS 3,692,698 A * 9/1972 Riley .................. B01J 23/85
502/220
6,162,350 A 12/2000 Soled et al.
(Continued)

FOREIGN PATENT DOCUMENTS

WO WO-2015171277 A1 * 11/2015 ............... A23D 9/00

OTHER PUBLICATIONS

Dhandapani, et al., "Synthesis, Characterization, and Reactivity Studies of Supported Mo2C with Phosphorus Additive", Journal of Catalysis, 1998, vol. 176, pp. 61-67.

*Primary Examiner* — Melissa S Swain
*Assistant Examiner* — Catriona M Corallo
(74) *Attorney, Agent, or Firm* — Shook, Hardy & Bacon L.L.P.

(57) ABSTRACT

Methods are provided for forming supported catalyst compositions and/or corresponding intermediate catalyst products. The catalyst compositions have improved activity for hydroprocessing of distillate boiling range feeds under hydroprocessing conditions where the hydrogen partial pressure in the hydroprocessing environment is reduced or minimized. The catalyst compositions can correspond to supported CoMo catalysts. The improved activity for hydroprocessing under lower pressure conditions is unexpectedly achieved by using a plurality of treatments with organic compounds during the catalyst formation process.

15 Claims, 9 Drawing Sheets

(51) Int. Cl.
  *B01J 31/02*    (2006.01)
  *B01J 31/04*    (2006.01)
  *B01J 35/63*    (2024.01)
  *B01J 37/02*    (2006.01)
  *B01J 37/08*    (2006.01)
  *B01J 37/20*    (2006.01)
  *C10G 45/08*    (2006.01)

(56) References Cited

U.S. PATENT DOCUMENTS

| | | | |
|---|---|---|---|
| 7,906,447 B2* | 3/2011 | McCarthy | C10G 45/08 502/24 |
| 2020/0327993 A1 | 10/2020 | Karbing et al. | |
| 2021/0114012 A1* | 4/2021 | Gabrielov | B01J 31/0209 |
| 2021/0331146 A1 | 10/2021 | Du et al. | |

* cited by examiner

LOW PRESSURE HYDROPROCESSING CATALYST

FIELD

This invention relates to CoMo-based supported hydroprocessing catalysts and corresponding methods of making such catalysts.

BACKGROUND

Hydroprocessing is a commonly used process for upgrading of petroleum and/or other hydrocarbonaceous fractions. Generally, hydroprocessing can involve exposing a petroleum and/or other hydrocarbonaceous feedstock to a catalyst in the presence of a hydrogen-containing or hydrogen-generating treat gas. Depending on the feedstock, catalyst, and the reaction conditions, hydroprocessing can be used for feedstock improvements such as: removal of heteroatoms from a feedstock (such as nitrogen, sulfur, and/or oxygen); saturation of olefins and/or aromatic rings; feedstock conversion to lower boiling range components; and/or improvement of cold flow properties.

One of the difficulties with upgrading feedstocks using hydroprocessing is that a substantial amount of hydrogen is needed for the reaction. This can lead to several types of costs associated with the hydroprocessing reaction. First, hydrogen itself is a relatively expensive resource to consume, as a separate process such as steam reforming is often needed to provide additional hydrogen to meet the needs of a refinery (and/or other location where hydrogen processing is performed). In addition to such production costs, on-site generation of hydrogen also typically results in additional production of $CO_2$. Further, hydroprocessing is performed at elevated pressures with relatively high purity hydrogen gas. Compression of gases primarily composed of hydrogen is also a relatively expensive process. Still another type of cost associated with hydroprocessing is the capital costs for the reactor and the hydroprocessing catalyst.

With regard to capital costs for catalysts, there are several factors that need to be balanced. Generally, increasing the content of catalytic metals in a catalyst can increase catalyst activity. As a result, non-supported or "bulk" catalysts that do not include a refractory oxide support can often have a higher catalyst activity (on a volume basis) for performing hydrodesulfurization and/or hydrodenitrogenation relative to supported catalysts. However, this activity advantage can come with a substantial increase in the cost for filling a reactor with sufficient catalyst to achieve a target level of contaminant removal. Additionally, supported catalysts can often have other beneficial properties relative to non-supported catalysts, such as higher resistance to attrition and/or catalyst degradation in a hydroprocessing environment.

One technique for improving the activity of supported hydroprocessing catalysts is to add an organic compound to the support along with one or more precursors for the catalytic metal(s). Such an organic compound is added to the support in order to assist with maintaining metal dispersion. Regardless of the exact order of adding the metal precursors and the organic compound, the organic compound can be subsequently removed from the surface in one of two manners. One option can be to expose the metals, organic compound, and support to sulfidation conditions. Sulfidation is often completed at temperatures of 300° C. or higher, resulting in decomposition and/or removal of typical organics used during catalyst synthesis. The other option can be to first expose the metals, organic compound, and support to a heating step prior to sulfidation. Such a heating step can at least partially convert the organic compound into carbon and/or remove the organic compound. To the degree that any portion of the organic compound remains on the surface after heating, such a remaining portion can then be removed during a subsequent sulfidation step. Sulfidation is used to convert the catalyst to the active form of the metal (or the highest activity form of the metal) for performing hydroprocessing.

What is needed are catalysts which can assist with reducing the costs associated with hydroprocessing.

U.S. patent application Ser. No. 17/185,290 filed Feb. 25, 2021 titled ""Method Of Making Mono And Bimetallic Group V, VI and/or Group VII Containing Carbides And Their Resulting Conversion Into Sulfides For Hydro Processing" describes supported catalysts that are made by forming a metal carbides on a support by depositing at least one metal precursor, an acid or an amine, and an organic compound on the support. The support is then carbonized under inert atmosphere to form metallic carbides. The metal carbides can then be converted to sulfides, which corresponds to the active form of the catalyst.

SUMMARY

In an aspect, a method for making a catalyst is provided. The method includes depositing a precursor comprising a Group 6 metal, a precursor comprising a Group 9 or Group 10 metal, an acid or a base, and a first organic compound on a support material to form a catalyst precursor. The method further includes heating the catalyst precursor to a temperature of 250° C. to 1000° C. in the presence of 20 vppm $O_2$ or less to form an intermediate catalyst product having a pore volume of 0.10 $cm^3/g$ or higher. Additionally, the method includes depositing a secondary organic compound having a boiling point of 250° C. or higher on the intermediate catalyst product to form a catalyst, the secondary organic compound being an alcohol, an amine or a combination thereof.

In some aspects, the method further includes sulfiding the catalyst to form a sulfided catalyst, wherein sulfiding the catalyst comprises exposing the catalyst to a sulfur-containing compound at a temperature of 250° C. or less.

In some aspects, the catalyst precursor can be heated to a temperature of 250° C. to 550° C. In some aspects, the catalyst precursor can be heated to a temperature of 250° C. to 500° C. In some aspects, the intermediate catalyst product can have a pore volume of 0.1 $cm^3/g$ to 0.6 $cm^3/g$.

In some aspects, the Group 6 metal is Mo and the Group 9 or Group 10 metal is Co. In some aspects, a molar ratio of the secondary organic product to combined metals on the intermediate catalyst product (such as combined Co and Mo) is 0.05 to 1.0.

In another aspect, a composition is provided. The composition can include a support material. The composition can further include a carbide particle phase containing cobalt and molybdenum, the carbide particle phase supported on the support material. The composition can have a molar ratio of Co to Mo of 0.1 to 1.2 and/or can contain 6.0 wt % to 40 wt % Mo, determined as a weight of metal oxide, relative to a weight of the composition. Optionally, the composition can have a pore volume of 0.1 $cm^3/g$ to 0.6 $cm^3/g$. Optionally, the composition can further include 1.0 wt % to 15 wt % Co, determined as a weight of metal oxide, relative to a weight of the composition.

In some aspects, 50% or more by number of particles in the carbide particle phase can have a a particle size of 1.5 nm or less as determined by transmission electron microscopy.

In some aspects, the composition can further include a secondary organic compound having a boiling point of 250° C. or higher. The secondary organic compound can be an alcohol, an amine, or a combination thereof. Optionally, a molar ratio of the secondary organic product to combined Co and Mo on the composition can be 0.05 to 1.0.

DETAILED DESCRIPTION

Figure 1:
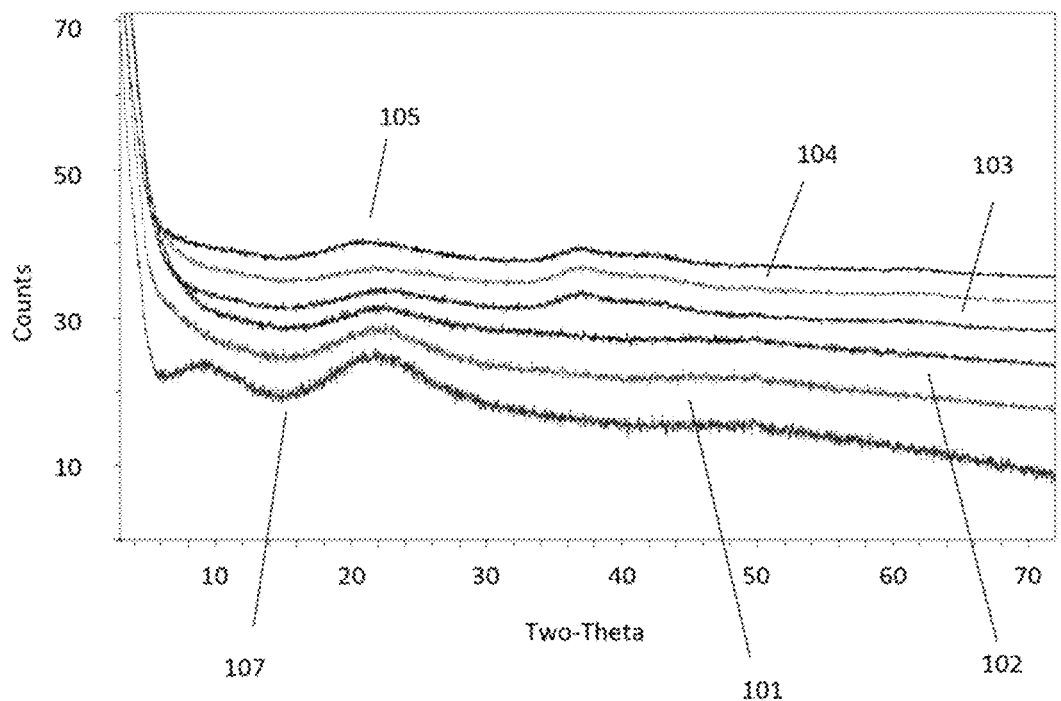
FIG. 1 shows XRD plots of intermediate catalyst products.

All numerical values within the detailed description and the claims herein are modified by "about" or "approximately" the indicated value, and take into account experimental error and variations that would be expected by a person having ordinary skill in the art.

In this discussion, references to the Periodic Table correspond to references to the current version of the IUPAC Periodic Table.

Overview

In various aspects, methods are provided for forming supported catalyst compositions and/or corresponding intermediate catalyst products. The catalyst compositions have improved activity for hydroprocessing of distillate boiling range feeds under hydroprocessing conditions where the hydrogen partial pressure in the hydroprocessing environment is reduced or minimized. The catalyst compositions can correspond to supported CoMo catalysts. The improved activity for hydroprocessing under lower pressure conditions is unexpectedly achieved by using a plurality of treatments with organic compounds during the catalyst formation process. A first treatment with an organic compound can occur prior to, during, and/or after exposing the support to metal precursors for depositing metals on the support. After both the first organic compound and the metal precursors are available in the presence of the support, a first heating and/or carbonizing step can be used to form dispersed metal carbides on the support. The first heating and/or carbonizing step can be performed at intermediate temperatures between 250° C. and 500° C., or 250° C. to 550° C., in order to maintain the metal carbides and/or the support in a favorable state. Without being bound by any particular theory, it is believed that this can allow sufficient pore volume to form to allow for incorporation of a secondary organic compound while reducing or minimizing increases in the size of metal carbide particles. It has been discovered that treating the supported metal carbides with a secondary organic compound after performing a first heating and/or carbonizing step at an intermediate temperature can result in a catalyst with unexpectedly high activity for hydrodesulfurization and/or hydrodenitrogenation. After treating the supported metal carbides with the secondary organic compound, a sulfidation can be performed where at least an initial portion of the sulfidation occurs at a temperature of 250° C. or less. This can allow the secondary organic compound to substantially remain on the support during at least a portion of the sulfidation process.

When forming a hydroprocessing catalyst corresponding to catalytic metals on a refractory support, the catalytic metals are typically added using some type of solution containing precursor compounds for the metals. A heating step is then used to convert the metal precursors into some type of metal-containing particle, such as metallic particles, metal oxide particles, or metal carbide particles. If an organic compound is added (such as an organic compound to facilitate metal dispersion and/or formation of smaller metal particles), the organic compound is added prior to this heating step. After the heating step, it is conventionally believed that further addition of organic compounds is not beneficial prior to sulfidation, as the particle size for the particles on the support has already been determined.

In contrast to this conventional expectation, it has been discovered that addition of a secondary organic compound to an intermediate catalyst product after initial heating but prior to sulfidation can result in unexpectedly higher hydroprocessing activity for the resulting catalyst. This benefit can be achieved when the heating step after addition of metal precursor compounds and a first organic compound is performed at an intermediate temperature, such as a temperature between 250° C. and 500° C., or between 250° C. and 550° C. When a second organic compound is added to such an intermediate catalyst product that is formed by heating to an intermediate temperature value, an unexpectedly large increase in hydroprocessing activity can be achieved when a secondary organic compound is then added to the intermediate catalyst product followed by subsequent sulfidation. Without being bound by any particular theory, it is believed that performing an initial heating step at an intermediate temperature on a catalyst precursor that includes a first organic compound can allow for formation of structure(s) with a substantial pore volume on the resulting intermediate catalyst product. It is believed that the secondary organic compound can interact with this pore volume to provide an unexpected catalytic activity increase in the final sulfided catalyst. It is noted that when the initial heating step includes temperatures greater than 500° C., or greater than 550° C. (such as 250° C. to 1000° C., or 500° C. to 1000° C., or 550° C. to 1000° C.), some increase in catalyst activity can still be achieved after deposition of a second organic compound and subsequent sulfidation. However, the full range of the unexpected increase in catalytic activity is achieved by heating to an intermediate temperature value.

In various aspects, the particles formed on the support after the first heating can correspond to metal carbide particles. Carbides may have substantially different physical, chemical, and electronic properties as compared to the base metal the carbide is derived from. The disparate properties of carbides may also affect the types of reactions which the carbide can participate in, including catalyzing reactions. In some aspects, the bimetallic carbides may form a unique carbide phase referred to as eta carbide phase, eta carbide, or η-carbide. Eta carbides are carbon deficient which yields unique physical and chemical properties. Eta carbides may be stable to high temperatures (1000° C.+) and do not experience phase separation at these elevated temperatures. The eta carbide phases contain the elements suitable for catalyzing hydroprocessing reaction; however, the elements are present in different ratios than traditional hydroprocessing catalysts.

The general process for preparation of carbide catalysts as described herein may include dissolving one or more precursor metals (optionally initially in the form of one or more precursor metal compounds) with an amine or acid followed by incipient wetness impregnation on a support. Thereafter, a long chain organic compound such as an acid (e.g., if the preceding step used an amine) or a base (e.g., if the preceding step used an acid) may be added to the support using incipient wetness impregnation. The support may then be heated under inert atmosphere as a first or initial heating step to form an intermediate catalyst product. In various aspects, the intermediate catalyst product can correspond to metal carbides supported on the support. It is noted that if oxygen is present during this initial heating step, the subsequent benefits from addition of the second organic compound are not substantially realized. Thus, during the initial heating step, the oxygen concentration in the atmosphere can be 20 vppm or less, or 10 vppm or less, such as down to having substantially no oxygen content. This can be achieved, for example, by performing the initial heating step in an atmosphere substantially comprised of $N_2$ and/or another non-reactive gas. It is noted that for some types of methods for detecting $O_2$ concentration, the detection limit is roughly 10 vppm.

After the initial heating step, a secondary organic compound can be added to the intermediate catalyst product, such as by incipient wetness, to form a catalyst in a pre-sulfided state. Examples of secondary organic compounds can include primary or secondary amines that have a sufficient boiling point so that at least a portion of the secondary organic compound remains on the intermediate catalyst product after heating to temperatures of up to 250° C. The support containing the metal carbide phases may then be subjected to a sulfidation procedure to convert the carbides to sulfides as the active catalytic phase.

In some aspects, the carbides formed in the intermediate catalyst product can be characterized in that a majority of carbide particles formed are less than 2.0 nm (such as down to 0.3 nm or possibly still lower) as measured on a major axis and after sulfidation, a majority of the sulfide phases comprise single stack layers. Further, the carbide particles formed can be well dispersed across the support. These and other properties of the produced carbides may contribute to the catalytic activity of the carbides in hydroprocessing applications. Without being bound by any particular theory, it is believed that the amine or acid in combination with the long chain organic compound forms a complex which slowly decomposes under heat and inert atmosphere in the initial heating step to allow the carbide phase to form. This can limit particle size and contribute to the dispersion of the carbide phase across the support.

Preparation of Catalyst Precursor, Intermediate Catalyst Product, and Catalyst

Suitable catalyst support materials can include, but are not limited to, silica ($SiO_2$), alumina ($Al_2O_3$), aluminosilicates, magnesia, titania, tungsten oxide ($WO_3$), zirconium oxide ($ZrO_2$), tungsten oxide/zirconium oxide ($WO_3/ZrO_2$), acidic clay, silicoaluminophosphates (SAPO), and combinations thereof. The support may be solid or porous and may have any suitable surface area, pore volume, and/or average particle size for hydrotreating applications. For example, the support may have one or more of a surface area in the range of from 10 to 1000 $m^2/g$, pore volume in a range of from 0.1 to 4.0 cc/g, and average particle size in a range of from 10 to 500 μm some examples, the support may have one or more of (such as all of) a surface area in a range of from 50 to 500 $m^2/g$, pore volume in a range of from 0.5 to 3.5 $cm^3/g$, and average particle size in a range of from 20 to 200 μm. Still further, in some examples the support may have one or more of (such as all of) a surface area in the range of from 100 to 400 $m^2/g$, pore volume in a range of from 0.8 to 3.0 $cm^3/g$, and average particle size may range from 20 to 100 μm.

In various aspects, the precursor metal compounds for forming a catalyst can correspond to precursor metals from Group 6 (Mo and/or W) and Group 9 or 10 (Co and/or Ni) of the Periodic Table. In some aspects, the precursor metal compounds can correspond to Co and Mo precursor compounds. In some aspects a precursor metal compound can be provided in an oxide form, an acid form, a hydroxide form, and/or a carbonate form. Some exemplary precursor metals can include, but are not limited to, molybdenum trioxide ($MoO_3$), molybdenum acid monohydrate ($MoO_3·H_2O$) and molybdenum acid monohydrate dihydrate ($MoO_3·2H_2O$), tungsten oxide ($WO_2O_3$, $WO_2$, $WO_3$, $W_2O_5$), tungstic acid monohydrate ($WO_3·H_2O$) and tungstic acid hemihydrate ($WO_3·0.5H_2O$). Other exemplary precursor metals can include, but are not limited to, $CoCO_3$, $Co(NO_3)_2$, $Co(OH)_2$, $Ni(NO_3)_2$, $Ni(OH)_2$, and $NiCO_3$. It is noted that although the precursor metal compounds are described as "compounds", in some aspects a metal can be provided in a metallic state, so that a precursor metal is used rather than a precursor metal compound.

More generally, the catalyst synthesis methods described herein can be used for forming catalysts having one or more metals selected from Groups 5-10 of the Periodic Table. In such aspects, a catalyst can include one or more metals selected from vanadium, niobium, tantalum, chromium, molybdenum, tungsten, manganese, technetium, rhenium, iron, ruthenium, rhodium, and combinations thereof.

In some aspects where a catalyst precursor or catalyst includes at least one Group 9-10 metal (such as Co) and at least one Group 6 metal (such as Mo), a molar ratio of Group 9-10 metal to Group 6 metal in a catalyst precursor or catalyst can be between 0.1 and 1.2 (i.e., between 0.1:1 and 1.2:1), or between 0.1 and 0.8, or between 0.2 and 0.5 (i.e., between 0.2:1 and 0.5:1). It is noted that ratios of Co to Mo of roughly 0.3 or higher can be beneficial for improving catalyst activity while reducing or minimizing catalyst cost.

Depending on the stage in the catalyst synthesis process (e.g., catalyst precursor, intermediate catalyst product, catalyst prior to sulfidation, catalyst after sulfidation), the metals on a support can potentially be in an oxide state, a carbide state, or a sulfide state. In some instances, it may be convenient to specify the amount of metal present on a support by specifying the amount of metals as if the metals were in oxide form. For example, an amount of Co can be expressed as the amount of CoO present on the support, while an amount of Mo can be expressed as the amount of $MoO_3$. In other aspects, it may be convenient to specify the amount of metals alone, and separately specify a state for the metal (such as one or more of an oxide state, a carbide state, or a sulfide state).

In many aspects, it can be more practical to specify the metal content of a catalyst precursor/intermediate catalyst product/catalyst based on the metal in oxide form, even if the metal would normally be present in a form other than oxide (such as in metal carbide form). This is due to practical considerations with how the weight of metal on a support can be determined. In particular, when a metal is present on a support as a metal carbide, a wide range of metal to carbon ratios are possible. Additionally, after a metal carbide is formed, additional carbon in some form (amorphous, graphitic, other) may also be present on the support without being directly associated with the metals. As a result, it can be difficult to quantify the amount of metal carbides on a surface. By contrast, if such a catalyst precursor/intermediate catalyst product/catalyst is exposed to oxidizing conditions at a sufficient temperature (e.g., combustion conditions), the metals on the catalyst can reliably be converted to known oxide forms. The amounts of metal oxides present on the support can then be determined in the usual manner for determining the weights of metals on a hydroprocessing catalyst. Thus, in some aspects, the weight of metals present on a support can be expressed as a weight of metal oxide, even though the actual form of the metal on the support may be another form (such as metal carbide).

When specifying the amount of metal oxide or metal, the amount of metal oxide or metal can be specified relative to the total weight of a catalyst precursor (i.e., support plus metal/metal oxide plus any other components supported on the support), relative to a total weight of an intermediate catalyst product (formed after the initial heating), relative to the total weight of the catalyst prior to sulfidation, or relative to the total weight of the catalyst after sulfidation.

When specifying the amount of metal based on the metal itself, the metals deposited on a support in a catalyst precursor/intermediate catalyst product/in a catalyst prior to sulfidation/in the catalyst after sulfidation can correspond to 0.1 wt % to 35 wt % of the total weight of the catalyst precursor/intermediate catalyst product/catalyst, or 1.0 wt % to 35 wt %, or 5.0 wt % to 35 wt %, or 10 wt % to 35 wt %, or 0.1 wt % to 30 wt %, or 1.0 wt % to 30 wt %, or 10 wt % to 30 wt %, or 20 wt % to 30 wt %. Additionally or alternatively, the amount of Mo (and/or other Group 6 metals) can correspond to 0.1 wt % to 30 wt % of the total weight of the catalyst precursor/intermediate catalyst product/catalyst, or 1.0 wt % to 30 wt %, or 6.0 wt % to 30 wt %, or 0.1 wt % to 25 wt %, or 1.0 wt % to 25 wt %, or 6.0 wt % to 25 wt %, or 0.1 wt % to 20 wt %, or 1.0 wt % to 20 wt %, or 6.0 wt % to 20 wt %. Further additionally or alternatively, the amount of Co (and/or other Group 9-10 metals) can correspond to 0.1 wt % to 12 wt % of the total weight of the catalyst precursor/intermediate catalyst product/catalyst, or 1.0 wt % to 12 wt %, or 0.1 wt % to 8.0 wt %, or 1.0 wt % to 8.0 wt %. It is noted that one option for determining the weight of metal(s) on a catalyst precursor/intermediate catalyst product/catalyst can be to convert the metal(s) to oxide form, determine the weight of oxides, and then calculate the weight of metals based on the weight of oxides.

When specifying the amount of metal based on a weight of metal oxide, the metals deposited on a support (in the form of metal oxide) in a catalyst precursor/in an intermediate catalyst product/in a catalyst prior to sulfidation/in the catalyst after sulfidation can correspond to 0.1 wt % to 50 wt % of the total weight of the catalyst precursor/intermediate catalyst product/catalyst, or 1.0 wt % to 50 wt %, or 6.0 wt % to 50 wt %, or 10 wt % to 50 wt %, or 20 wt % to 50 wt %, or 0.1 wt % to 40 wt %, or 1.0 wt % to 40 wt %, or 10 wt % to 40 wt %, or 20 wt % to 40 wt %. Additionally or alternately, the amount of Mo (and/or other Group 6 metals) can correspond to 0.1 wt % to 40 wt % of the total weight of the catalyst precursor/intermediate catalyst product/catalyst, or 1.0 wt % to 40 wt %, or 6.0 wt % to 40 wt %, or 10 wt % to 40 wt %, or 0.1 wt % to 35 wt %, or 1.0 wt % to 35 wt %, or 10 wt % to 35 wt %, or 0.1 wt % to 30 wt %, or 1.0 wt % to 30 wt %, or 10 wt % to 30 wt %. Further additionally or alternatively, the amount of Co (and/or other Group 9-10 metals) can correspond to 0.1 wt % to 15 wt % of the total weight of the catalyst precursor/intermediate catalyst product/catalyst, or 1.0 wt % to 15 wt %, or 0.1 wt % to 10 wt %, or 1.0 wt % to 10 wt %, or 0.1 wt % to 7.5 wt %, or 1.0 wt % to 7.5 wt %.

In some aspects, metals can be present on a support in an intermediate catalyst product/on a catalyst prior to sulfidation in the form of metal carbides. For example, Co and Mo can be present as carbides. When metals are present as carbides, the stoichiometry of the carbides may be expressed as "Cx" in some aspects. When "x" is used to describe a carbide, it can represent any convenient stoichiometric amount of carbon that may be present in association with metals to form a carbide. In other words, use of "x" to describe a carbide indicates that a particular stoichiometric amount of carbon is not specified.

When forming a catalyst precursor, the precursor metal compounds (and/or precursor metals) may be dissolved in an amine or an acid prior to incipient wetness deposition onto the support. The amine or acid may be, for example a primary amine or a carboxylic acid. In some examples the acid or amine may have chelating properties which may at least partially chelate the precursor metal or metals to form a metal complex in solution. Some example acids or amines may include, without limitation, ethylenediamine, citric acid, malic acid, 2-(2-aminoethylamino) ethanol, 1,2 diamine cyclohexane, and combinations thereof. The acid or amine may be used in any convenient molar ratio with the precursor metal. In some aspects the molar ratio of acid or amine to precursor metal can be between 1.0 to 10 (i.e., between 1:1 and 10:1), or between 1.0 to 8.0, or between 1.0 to 5.0, or between 3.0 to 10, or between 3.0 to 8.0.

In various aspects, a long chain organic compound can also be introduced into the catalyst precursor before, during, and/or after introduction of the precursor metal compound(s) (and/or precursor metals). The long chain organic compound can be introduced prior to the initial heating step. (After the initial heating step, the catalyst precursor is converted into an intermediate catalyst product.) The long chain organic compound may form a complex with the acid or amine used to dissolve the precursor metal. Without being bound by any particular theory, in aspects where the catalyst formed from a catalyst precursor includes metal carbides, it is believed that use of a long chain organic compound may assist with stabilizing the carbide during the initial heating step. Further, the long chain organic compound may be a source of carbon when forming metal carbides. Long chain organic compounds may degrade slowly during the initial heating step which may promote smaller carbide particle sizes to form in the intermediate catalyst product. The long chain may correspond to any long chain organic compound(s) with carbon numbers from $C_{10}$ to $C_{24}$. The long chain organic compound(s) can include functional groups such as (but not limited to) carboxylic acid, amine, alcohol, phosphate, acrylate, and ketone. In some examples, the long chain organic compound may be a long chain fatty acid or long chain fatty amine with carbon numbers from $C_{10}$ to $C_{24}$. Some examples of long chain organic compounds include, but are not limited to, oleylamine, oleic acid, and combinations thereof. The long chain organic compound can be selected such that the long chain organic compound has an opposite change of the amine or acid selected to dissolve the precursor metal or metals. For example, if an acid is selected to dissolve the precursor metal, then a long chain organic compound comprising an amine may be selected. Alternatively, if an amine is selected to dissolve the precursor metal, a long chain organic compound comprising a carboxylic acid can be selected. The long chain organic compound may be used in any convenient molar ratio relative to the precursor metal. In some aspects the molar ratio of the long chain organic compound to precursor metal can be between 1.0 to 10 (i.e., between 1:1 and 10:1), or between 1.0 to 8.0, or between 1.0 to 5.0, or between 3.0 to 10, or between 3.0 to 8.0. In some examples, the long chain organic compound can be diluted with a carrier fluid before deposition onto the support. For example, the long chain organic compound may be diluted with a simple alkane such as hexane, cyclohexane, heptane, octane, or any isomers thereof.

After depositing one or more metal precursor compounds (and/or metal precursors), an acid or a base, and a long chain organic compound, the catalyst precursor can be exposed to an initial heating step to form an intermediate catalyst product. The temperature during the initial heating step can be 250° C. to 1000° C., or 250° C. to 750° C., or 250° C. to 550° C., or 250° C. to 500° C. The catalyst precursor can be exposed to the initial heating step for a time of 20 minutes to 24 hours.

In various aspects, metal carbides can be formed during the initial heating step by incorporating carbon from the long chain organic compound. This can reduce, minimize, and/or eliminate the need to have a source of carbon present in the atmosphere during formation of metal carbides. Instead, a substantially inert atmosphere can be used, such as an atmosphere of $N_2$, He, other noble gases, or a combination thereof, or another convenient inert atmosphere. In some aspects, the atmosphere present during the initial heating step can contain 50 vppm or less of carbon-containing gases, such as $CH_4$, $CO_2$, and/or CO, or 10 vppm or less, such as down to having substantially no carbon-containing gases (0.01 vppm or less). In some aspects, the atmosphere can be substantially free of $O_2$, such as having an atmosphere that contains 10 vppm or less of $O_2$, such as down to potentially no measurable $O_2$ content.

It has been discovered that performing the initial heating in an environment that is substantially free of $O_2$ and at a temperature of 250° C. to 550° C., or 250° C. to 500° C., can allow for development of several features for the resulting intermediate catalyst product. In particular, performing the initial heating under such conditions can allow for formation of metal carbides while also forming surface structures that have a pore volume between 0.10 cm³/g and 1.0 cm³/g. Such pore volumes can be determined, for example, using nitrogen desorption according to ASTM D4641. It has been discovered that performing the initial heating at a temperature of 250° C. or more can allow surface structures having a pore volume of 0.10 cm³/g or more to form. This pore volume is then available for receiving the secondary organic compound. Increasing the temperature to up to 550° C. (or up to 500° C.) during initial heating can increase the amount of available pore volume while reducing or minimizing the amount of size increase for the metal carbide particles on the intermediate catalyst product. Without being bound by any particular theory, it is believed that when the secondary organic compound is added to an intermediate catalyst product, the secondary organic compound can enter into and/or otherwise interact with these pores. By providing a substantial pore volume while reducing or minimizing increases in the size of the metal carbide particles, the benefits of adding the secondary organic compound and the benefits of smaller particle size catalyst can be achieved. It is noted that additional temperature increases up to roughly 750° C. can result in still further increases in pore volume, and substantial pore volumes can still be maintained for temperatures as high as 1000° C. during initial heating. However, such heating at temperatures greater than 550° C. (or greater than 500° C.) appears to also shift the distribution of catalyst particle sizes to larger values. Without being bound by any particular theory, it is believed that the additional benefit of adding the secondary organic material to a catalyst is at least partially offset by this increase in the size of catalyst particles. It is further noted that after the initial heating step, exposure to oxygen at temperatures below roughly 50° C. can be performed while having a reduced or minimized impact on the metal carbides and/or other structures formed on the support.

In some aspects, the metal carbides formed on the intermediate catalyst product can have a majority of carbide particles monodispersed in a single layer across the support. For example, 50% or more by number of the metal carbide particulates can be monodispersed, or 75% or more by number, or 90% or more by number, such as up to 100%. Additionally or alternately, the metal carbides produced may have a relatively small average particle size. For example, the metal carbides can have a measured particle size on a major axis of 2.0 nm or less, as measured by transmission electron microscopy, or 1.5 nm or less, or 1.0 nm or less, such as down to 0.3 nm or possibly still lower. Further additionally or alternately, the metal carbides can have a majority of the carbide phase present as eta carbide. For example, the eta carbide phase can correspond to 50 wt % or more of the metal carbides on the intermediate catalyst product, or 75 wt % or more, or 90 wt % or more, such as up to substantially all metal carbides having the eta carbide phase.

After the initial heating step, the intermediate catalyst product can be exposed to a secondary organic compound. Preferably, the secondary organic compound can correspond to an amine or an alcohol. The secondary organic compound can have a sufficient molecular weight so that at least a portion of the secondary organic compound remains on the intermediate catalyst product during heating of the catalyst product to temperatures of up to roughly 200° C., or up to 220° C., or up to 250° C. This can be achieved, for example, by using a primary or secondary amine with a boiling point of 200° C. or more, or 220° C. or more, or 250° C. or more. It is noted that sulfidation processes can be carried out at temperatures of 200° C. or more, or 220° C. or more, or 250° C. or more. Without being bound by any particular theory, by having a secondary organic compound that at least partially remains on the intermediate catalyst product at such temperatures, the secondary organic compound can be present when sulfidation occurs. Stearyl amine (IUPAC name octadecan-1-amine) is an example of a primary amine that can be used as the secondary organic compound. Stearyl amine has a boiling point of roughly 346° C. Hydroquinone (benzene-1,4,-diol) is an example of an alcohol that can be used as the secondary organic compound, with a boiling point of roughly 287° C. In some aspects, the molar ratio of the secondary organic compound to combined metals on the catalyst (Group 6, Group 9, and/or Group 10) can be between 0.05 (i.e., 0.05:1) and 1.0 (i.e., 1:1), or 0.1 to 1.0, or 0.05 to 0.8, or 0.1 to 0.8

After forming the intermediate catalyst product and then adding the secondary organic compound, the resulting catalyst can be converted to the active sulfide form by sulfidation. The carbide catalysts may be exposed to sulfur under conditions effective to convert the carbide phase to the corresponding sulfided phase. Examples of such conditions can include liquid sulfurization conditions or gaseous sulfurization conditions.

As an example, a laboratory scale gas phase sulfidation may include placing the intermediate catalyst product (including the secondary organic compound) in an inert container such as a quartz boat which may be in turn inserted into a horizontal quartz tube and placed into a Lindberg furnace. While still at room temperature, a flow of 240 cm$^3$/min of 10 vol % $H_2S$ in $H_2$ can be introduced to the furnace for 15 minutes. The temperature can then be raised to roughly 220° C. over 30 minutes with 10 vol % $H_2S/H_2$ flowing at 240 cm$^3$/min. After holding at 220° C. for an hour, the temperature can be raised to 400° C. and held for another hour. The sample may then be cooled in flowing 10 vol % $H_2S/H_2$ to room temperature and held at room temperature for 30 minutes at the same flow. Thereafter, the sample may be purged with 300 cm$^3$/min of flowing $N_2$ for 30 minutes. A 1% $O_2$ in Ar passivation gas may then be introduced at 50 cm$^3$/min at room temperature and passed over the catalyst overnight.

As another example, a laboratory scale method for liquid sulfidation may include placing the intermediate catalyst product (including the secondary organic compound) into a continuously stirred reactor. $H_2$ flowing at 50 cm$^3$/min may be added to the reactor and the temperature may be raised to 100° C. At 100° C., the pressure may be maintained at 100 psig (~690 kPa-g) and the $H_2$ flow may be stopped. A sulfiding feed, such as 7.5 wt % of dimethyl disulfide dissolved in a diesel feed, may be introduced to the reactor at 8 ml/hr and contacted with the intermediate catalyst product for 4 hours. Then, with the sulfiding feed continuing, 24 l/hr $H_2$ may be added to the reactor and the pressure may be raised to roughly 4 MPa-g. The temperature may then be increased to 200° C. over 1.5 hours, and then to 235° C. over 2 hours. The reactor may then be held under isothermal conditions at 235° C. for 16 hours. Following the isothermal hold, the temperature may be raised to 290° C. over a period of 10 hours, followed by increasing to 340° C. over 2 hours and finally holding at 340° C. for 10 hours. More generally, sulfidation may include loading a reactor with the intermediate catalyst product (including the secondary organic compound) and exposing the intermediate catalyst product to a sulfur source at conditions effective to convert at least a portion of the metal carbides (or metal oxides) on the intermediate catalyst product to the corresponding sulfided phase. Preferably, the sulfidation can include exposing the intermediate catalyst product to a sulfur source at a temperature between 180° C. and 250° C. for at least a period of time, to allow for sulfidation to at least partially occur while in the presence of the secondary organic compound.

Feedstock for Hydroprocessing

After sulfidation, the catalysts described herein can be used to perform hydroprocessing, such as hydrotreatment of distillate boiling range feeds to reduce the sulfur content and/or nitrogen content of the feed. Some examples of distillate boiling range feedstocks can include mineral feedstocks. Mineral feedstocks are typically derived from crude oil and have optionally been subjected to one or more separation and/or other refining processes. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof. In this discussion, a distillate boiling range feed can correspond to a feed with a T10 distillation point of 170° C. or more, or 200° C. or more (such as up to 300° C.); and a T90 distillation point of 425° C. or less, or 400° C. or less (such as down to 320° C.). Fractional weight distillation points can be determined, for example, according to ASTM D2887.

In some aspects, a mineral feedstock can have a nitrogen content of 10 wppm or more, or 100 wppm or more, or 500 wppm or more, such as up to 2500 wppm or possibly still higher. In some aspects, a mineral feedstock can have a sulfur content of 100 wppm or more, or 1000 wppm or more, or 5000 wppm or more, such as up to 20,000 wppm or possibly still higher. Some examples of mineral feedstocks can correspond to mineral feedstocks with a sulfur content of 100 wppm to 10,000 wppm, or 100 wppm to 5000 wppm, or 10 wppm to 1000 wppm. Additionally or alternately, some examples of mineral feedstocks can correspond to mineral feedstocks with a nitrogen content of 10 wppm to 1500 wppm, or 100 wppm to 1500 wppm, or 500 wppm to 1500 wppm, or 10 wppm to 500 wppm, or 100 wppm to 800 wppm.

In some aspects, a mineral feedstock (or feedstocks) can be blended with one or more non-mineral feedstocks, such as feeds derived from Fischer-Tropsch synthesis, feeds derived from a biological source, and/or other feeds not derived from processing of crude oils.

In some aspects, catalysts described herein can be used to perform hydroprocessing of distillate boiling range feedstocks at relatively low pressures. For example, the hydrogen partial pressure during hydrotreatment can be 100 psig (0.7 MPa-g) to 1000 psig (6.9 MPa-g), or 100 psig (0.7 MPa-g) to 800 psig (5.5 MPa-g), or 300 psig (2.1 MPa-g) to 1000 psig (6.9 MPa-g), or 300 psig (2.1 MPa-g) to 800 psig (5.5 MPa-g).

The hydrotreating conditions can also include a temperature, a hydrogen treat gas rate, and a liquid hourly space velocity (LHSV). Suitable effective temperatures can be from 230° C. to 400° C., or 250° C. to 350° C. The LHSV can be from 0.1 hr$^{-1}$ to 10 hr$^{-1}$, or from 0.2 hr$^{-1}$ to 5.0 hr$^{-1}$. The hydrogen treat gas rate can be any convenient value that provides sufficient hydrogen for deoxygenation of a feedstock. Typical values can range from 500 scf/B (84 Nm$^3$/m$^3$) to 10,000 scf/B (1685 Nm$^3$/m$^3$).

EXAMPLES

The following examples describe synthesis of various catalysts, characterization of the catalysts, and performance of the catalysts for performing low pressure hydrodesulfurization and/or hydrodenitrogenation of distillate boiling range feeds.

Examples 1-6: $Co_{0.3}MoC_x/SiO_2$

Examples 1-5 were catalysts formed by sulfiding an intermediate catalyst product corresponding to $Co_{0.3}MoC_x$ supported on an $SiO_2$ support, with stearyl amine as the secondary organic compound on the intermediate catalyst product prior to sulfidation.

Example 1 was made by adding 7.14 g molybdenum oxide ($MoO_3$) and 6.25 g ethylenediamine (en) solution to 30 ml water, followed by the addition of 1.77 g cobalt carbonate ($CoCO_3$) at 70° C. The solution was then heated to concentrate down the solution to achieve a total volume of 17 ml. This was done to increase the concentration of the precursor metal compounds in the solution to levels that could not be directly achieved by simply mixing the precursor metal compounds in water. The solution was then added onto 15 g of Davisil™ 646 $SiO_2$ at 70° C. through incipient wetness to achieve a target loading of 5.12 wt % CoO and 28.23 wt % $MoO_3$ on the support. The impregnated support was spread in a thin layer to dry at 100° C. overnight. Next, 7.25 g of oleic acid was impregnated onto the above product at 50° C., followed by drying again at 100° C. Samples with oleic acid were then heated at 3° C./min to 300° C. under $N_2$ in a tube furnace and held at that temperature for 2 hours. This corresponded to the initial heating step. The furnace was then shut off and cooled to room temperature under $N_2$. The tube furnace was then purged with a diluted stream of $O_2$ in He before samples (corresponding to an intermediate catalyst product) were extracted. The ratios of Co to Mo to ethylenediamine to oleic acid were kept at 0.3 to 1 to 2.1 to 0.5 to increase or maximize solubility and loading of CoO and $MoO_3$ onto the support. Next, 0.645 g stearyl amine was diluted into 1.30 ml heptane at 60° C. The resulting solution of stearyl amine in heptane was added to 6.77 g of the $N_2$ treated products, followed by additional drying at 140° C. under $N_2$ overnight. The intermediate catalyst product including stearyl amine as a secondary organic compound was then characterized using X-ray diffraction (XRD). The XRD pattern showed that the metals were in the form of metal carbide. The CoMo carbide was small and preserved an amorphous XRD pattern.

Example 2 was made using a similar procedure to Example 1, but with two differences. First, after adding the oleic acid, the samples with oleic acid were heated at 3° C./min to 450° C. under $N_2$ in a tube furnace and held at that temperature for 2 hours. Second, for the secondary organic compound, 1.870 g stearyl amine was diluted into 3.77 ml heptane at 60° C. The resulting solution of stearyl amine in heptane was added to 6.77 g of the $N_2$ treated products, followed by additional drying at 140° C. under $N_2$ overnight. The intermediate catalyst product including stearyl amine as a secondary organic compound was then characterized using X-ray diffraction (XRD). The XRD pattern showed that the metals were in the form of metal carbide. The CoMo carbide was small and preserved an amorphous XRD pattern.

Example 3 was made using a similar procedure to Example 1, but with two differences. First, after adding the oleic acid, the samples with oleic acid were heated at 3° C./min to 600° C. under $N_2$ in a tube furnace and held at that temperature for 2 hours. Second, for the secondary organic compound, 2.064 g stearyl amine was diluted into 4.16 ml heptane at 60° C. The resulting solution of stearyl amine in heptane was added to 6.77 g of the $N_2$ treated products, followed by additional drying at 140° C. under $N_2$ overnight. The intermediate catalyst product including stearyl amine as a secondary organic compound was then characterized using X-ray diffraction (XRD). The XRD pattern showed that the metals were in the form of metal carbide. The CoMo carbide was small and preserved an amorphous XRD pattern.

Example 4 was made using a similar procedure to Example 1, but with two differences. First, after adding the oleic acid, the samples with oleic acid were heated at 3° C./min to 750° C. under $N_2$ in a tube furnace and held at that temperature for 2 hours. Second, for the secondary organic compound, 2.451 g stearyl amine was diluted into 5.00 ml heptane at 60° C. The resulting solution of stearyl amine in heptane was added to 6.77 g of the $N_2$ treated products, followed by additional drying at 140° C. under $N_2$ overnight. The intermediate catalyst product including stearyl amine as a secondary organic compound was then characterized using X-ray diffraction (XRD). The XRD pattern showed that the metals were in the form of metal carbide. The CoMo carbide was small and preserved an amorphous XRD pattern.

Example 5 was made using a similar procedure to Example 1, but with two differences. First, after adding the oleic acid, the samples with oleic acid were heated at 3° C./min to 900° C. under $N_2$ in a tube furnace and held at that temperature for 2 hours. Second, for the secondary organic compound, 2.322 g stearyl amine was diluted into 4.21 ml heptane at 60° C. The resulting solution of stearyl amine in heptane was added to 6.77 g of the $N_2$ treated products, followed by additional drying at 140° C. under $N_2$ overnight. The intermediate catalyst product including stearyl amine as a secondary organic compound was then characterized using X-ray diffraction (XRD). The XRD pattern showed that the metals were in the form of metal carbide. The CoMo carbide was small and preserved an amorphous XRD pattern.

Example 6—Hydroquinone as Secondary Organic Compound

Example 6 was made using a procedure similar to Example 1, but with two differences. First, after adding the oleic acid, the samples with oleic acid were heated at 3° C./min to 750° C. under $N_2$ in a tube furnace and held at that temperature for 2 hours. (Thus, prior to adding the secondary organic compound, Example 6 was similar to Example 4.) Second, for the secondary organic compound, 1.87 g hydroquinone was diluted into 5.00 ml acetone at 50° C. The resulting solution of hydroquinone in acetone was added to 4.94 g of the $N_2$ treated products, followed by additional drying at 140° C. under $N_2$ overnight. The intermediate catalyst product including hydroquinone as a secondary organic compound was then characterized using X-ray diffraction (XRD). The XRD pattern showed that the metals were in the form of metal carbide. The CoMo carbide was small and preserved an amorphous XRD pattern.

Comparative Example 7

Comparative Example 7 was made using a similar procedure to Example 1, but with two differences. First, after adding the oleic acid, the samples with oleic acid were heated at 3° C./min to only 140° C. under $N_2$ in a tube furnace and held at that temperature for 2 hours. Second, a secondary organic compound was not added after the initial heating to 140° C. Instead, after the initial heating to 140° C., the intermediate catalyst product was then characterized using X-ray diffraction (XRD). The XRD pattern showed that the metals were in the form of metal carbide. The CoMo carbide was small and preserved an amorphous XRD pattern.

It is noted that part of the reason for not adding the secondary organic compound is that the pore volume of the sample after heating to 140° C. was less than 0.02 $cm^3/g$. (See Example 11 below.) Due to this low pore volume, it was not feasible to add a meaningful amount of the secondary organic compound to the intermediate catalyst product.

Example 8

Example 8 was made by adding 5.355 g molybdenum oxide and 11.513 g diethylenetetraamine (deta) solution to 28 ml water, followed by the addition of 4.425 g cobalt carbonate at 70° C. The solution was then heated to concentrate down the solution to achieve a total volume of 26 ml. 20 ml samples of this solution were then added onto 21.8 g Davisil 646 SiO$_2$ at 70° C. through incipient wetness to achieve a target metal oxide loading of 9.5 wt % CoO and 16.22 wt % MoO$_3$. The impregnate was spread in a thin layer to dry at 100° C. overnight. Next, 8.355 g oleic acid was impregnated onto the above product at 50° C., then the product was dried again at 100° C. The samples with oleic acid were then heated at 3° C./min to 750° C. under N$_2$ in the tube furnace and held at that temperature for 2 hours to form the intermediate catalyst product. The furnace was then shut off and cooled to room temperature under N$_2$. The tube furnace was then purged with a diluted stream of O$_2$ in He before samples were extracted. The ratios of Co to Mo to diethylenetetraamine to oleic acid were kept at 1 to 1 to 3 to 0.6. Next, 2.452 g stearyl amine was diluted into 5.00 ml heptane at 60° C. The resulting solution of stearyl amine in heptane was then added to 5.875 g of the N$_2$ treated products to form the catalyst. The catalyst was then dried at 140° C. under N$_2$ overnight. It is noted that the ratio of Co to Mo is substantially higher in Example 8 in comparison to Example 1.

Example 9

Example 9 was made by adding 7.140 g molybdenum oxide and 11.944 g diethylenetetraamine (deta) solution to 28 ml water, followed by the addition of 5.900 g cobalt carbonate at 70° C. The solution was then heated to concentrate down the solution to achieve a total volume of 38 ml. 31 ml samples of this solution were then added onto 28.24 g Davisil 646 SiO$_2$ at 70° C. through incipient wetness to achieve a target metal oxide loading of 9.7 wt % CoO and 16.55 wt % MoO$_3$. The impregnate was spread in a thin layer to dry at 100° C. overnight. Next, 8.355 g oleic acid was impregnated onto the above product at 50° C., then the product was dried again at 100° C. The samples with oleic acid were then heated at 3° C./min to 750° C. under N$_2$ in the tube furnace and held at that temperature for 2 hours to form the intermediate catalyst product. The furnace was then shut off and cooled to room temperature under N$_2$. The tube furnace was then purged with a diluted stream of O$_2$ in He before samples were extracted. The ratios of Co to Mo to diethylenetetraamine to oleic acid were kept at 1 to 1 to 4 to 1. Next, 2.922 g stearyl amine was diluted into 5.00 ml heptane at 60° C. The resulting solution of stearyl amine in heptane was then added to 6.347 g of the N$_2$ treated products to form the catalyst. The catalyst was then dried at 140° C. under N$_2$ overnight.

Comparative Example 10

Comparative Example 10 is similar to Example 9, but after formation of the intermediate catalyst product, no further additions were made. Thus, a secondary organic compound is not used in Comparative Example 10.

Example 11—Characterization of Samples

The catalysts generated in Examples 1-6, 8, and 9, and Comparative Examples 7 and 10, were characterized using X-Ray Diffraction (XRD) and Transmission Electron Microscopy (TEM). The intermediate catalyst products generated for Examples 1-5 and Comparative Example 7 were also characterized to determine pore volumes for the intermediate catalyst products after initial heating but prior to deposition of the secondary organic compound (where applicable).

Table 1 shows the peak temperature in the initial heating step and the corresponding pore volume for the intermediate catalyst product for samples from Examples 1-5 and Comparative Example 7. As shown in Table 1, heating to a temperature between 250° C. and 500° C. resulted in pore volumes between 0.1 cm$^3$/g and 0.6 cm$^3$/g. Heating to higher temperatures resulted in increased pore volumes. Heating to a temperature below 250° C. resulted in a pore volume of less than 0.05 cm$^3$/g.

TABLE 1

| | Pore Volumes | |
| --- | --- | --- |
| | Temperature (initial heating step) | Pore Volume (ASTM D4641) |
| Example 1 | 300° C. | 0.19 cm$^3$/g |
| Example 2 | 450° C. | 0.56 cm$^3$/g |
| Example 3 | 600° C. | 0.61 cm$^3$/g |
| Example 4 | 750° C. | 0.74 cm$^3$/g |
| Example 5 | 900° C. | 0.62 cm$^3$/g |
| Comp Example 7 | 140° C. | <0.02 cm$^3$/g |

FIG. 1 shows XRD patterns from the catalysts formed in Examples 1-5 and Comparative Example 7. The XRD patterns were obtained before exposing the catalysts to a sulfidation treatment. Thus, the catalytic metals were present on the catalyst as a metal carbide phase. In FIG. 1, Examples 1-5 correspond to XRD patterns 101-105, respectively, while Comparative Example 7 corresponds to XRD pattern 107.

As shown in FIG. 1, the XRD patterns obtained from the catalysts in Examples 1-5 are qualitatively similar. In the patterns 101-105, the bump at 2θ values between 36 to 44 corresponds to CoMo carbide phases, while the bump at 2θ values between 16 to 26 corresponds to the amorphous silica support. The XRD pattern 107 for Comparative Example 7 shows bumps at similar 2θ values, but also includes an extra peak at a 2θ value of less than 10.

Figure 2:
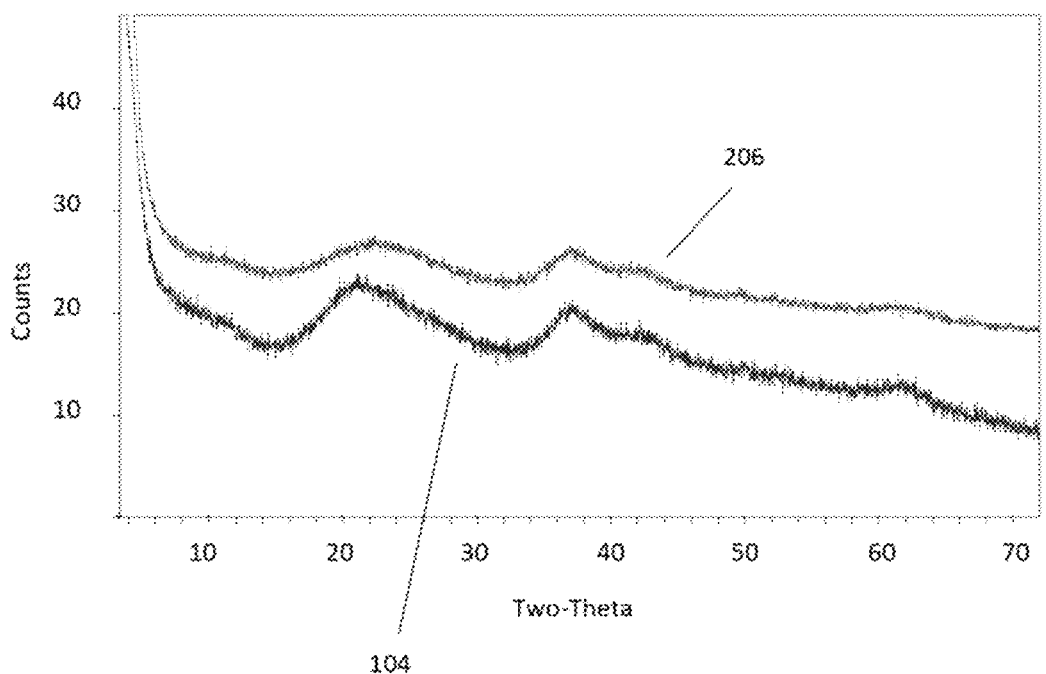
FIG. 2 shows XRD plots of additional intermediate catalyst products.

FIG. 2 shows a comparison of XRD pattern 104 (from Example 4) and an XRD pattern 206 corresponding to the catalyst from Example 6. As noted above, the catalysts from Example 4 and Example 6 differ only in the use of a different secondary organic compound. As shown in FIG. 2, XRD pattern 104 is qualitatively similar to XRD pattern 206.

Figure 3:
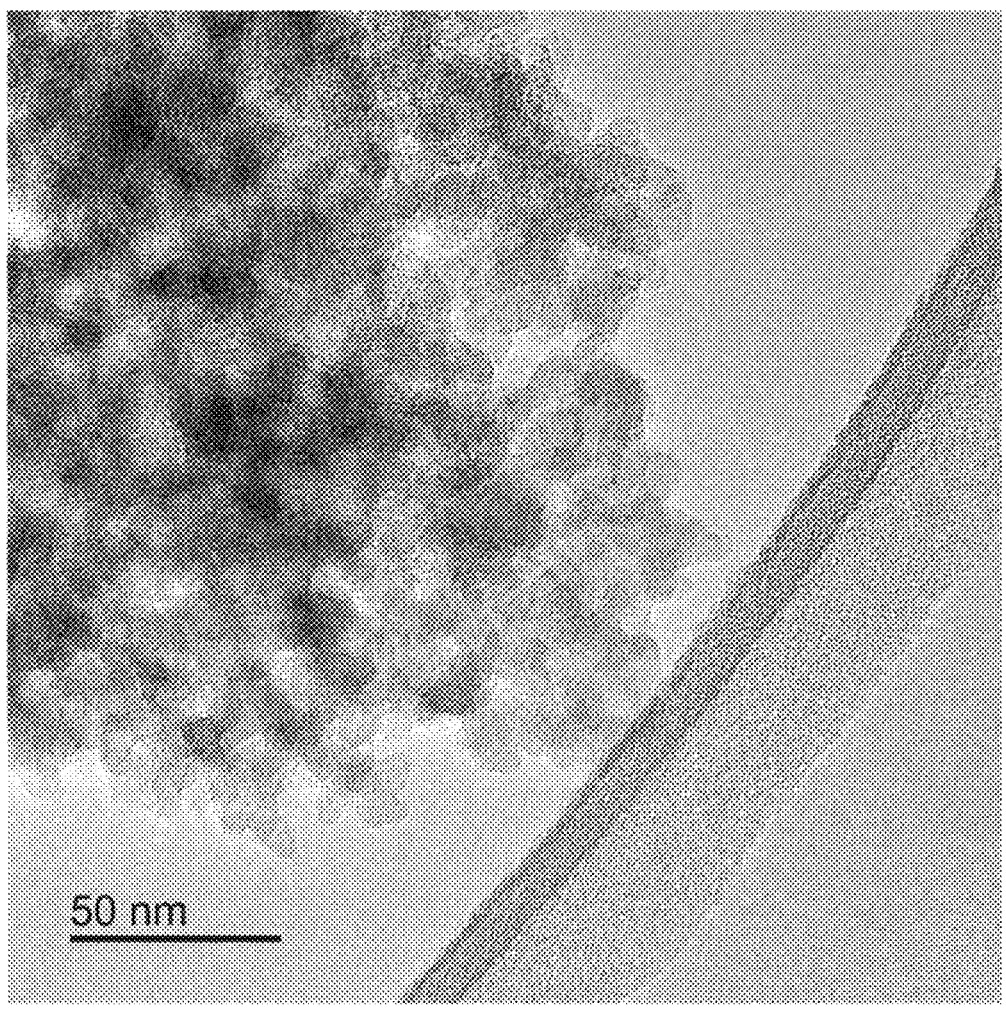
FIG. 3 shows a transmission electron microscropy (TEM) micrograph of $CoMoC_x$ particles on an intermediate catalyst product.

FIG. 3 shows a TEM image of the catalyst formed according to Example 1. In the TEM shown in FIG. 3, all of the catalyst particles have a particle size of less than 1.0 nm.

Figure 4:
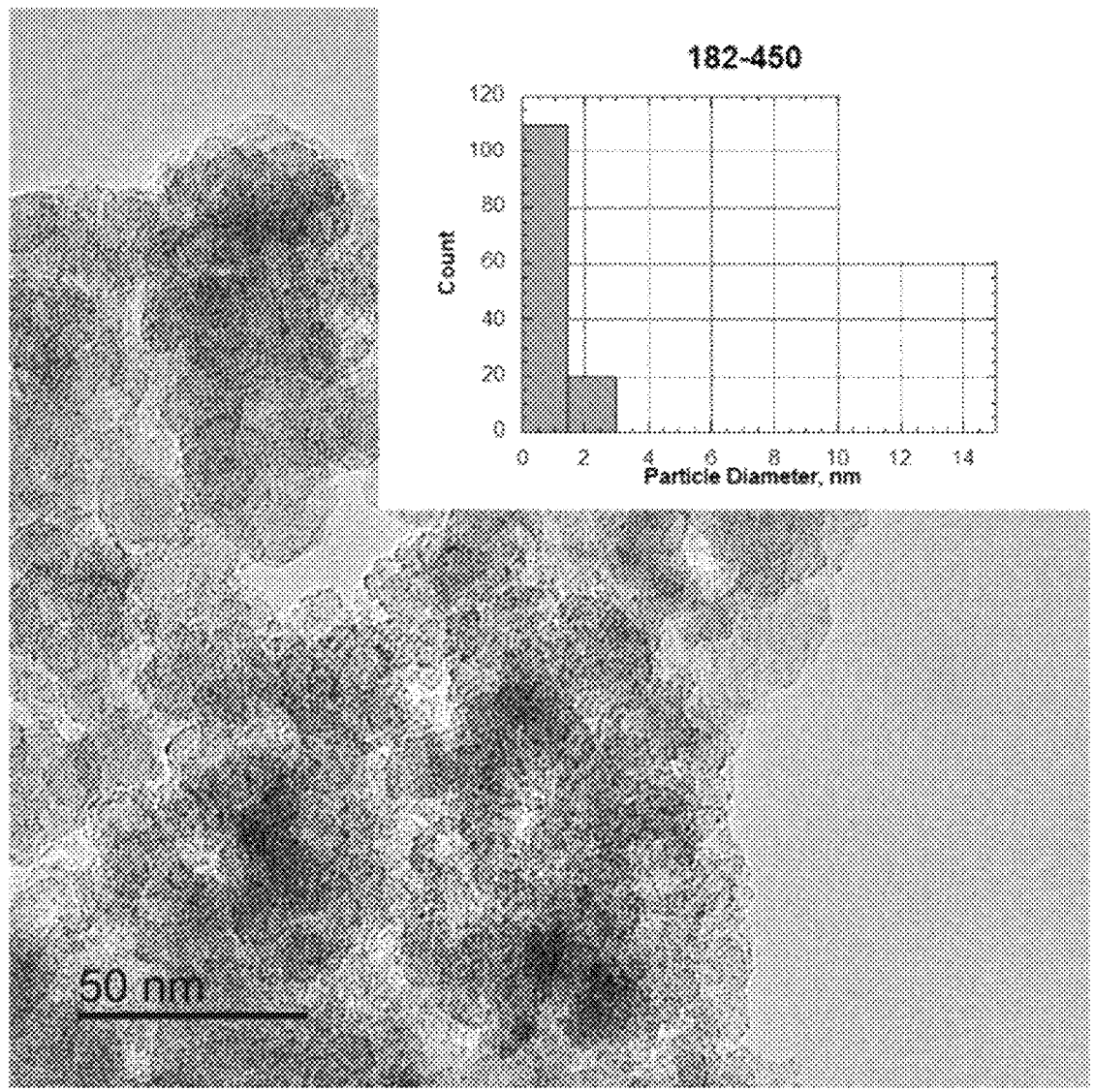
FIG. 4 shows TEM micrographs of $CoMoC_x$ particles on additional intermediate catalyst products.
Figure 5:
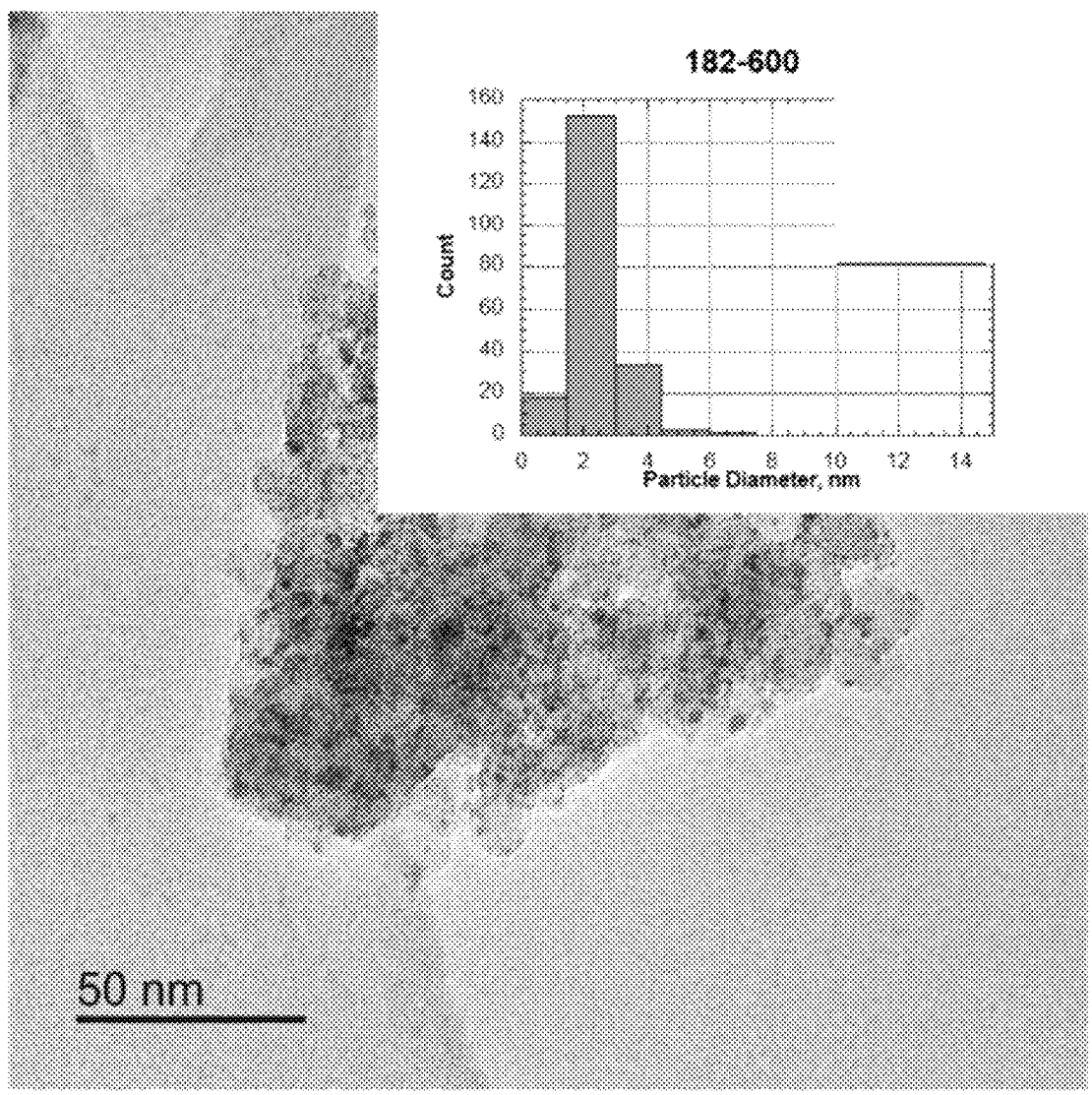
FIG. 5 shows TEM micrographs of $CoMoC_x$ particles on additional intermediate catalyst products.
Figure 6:
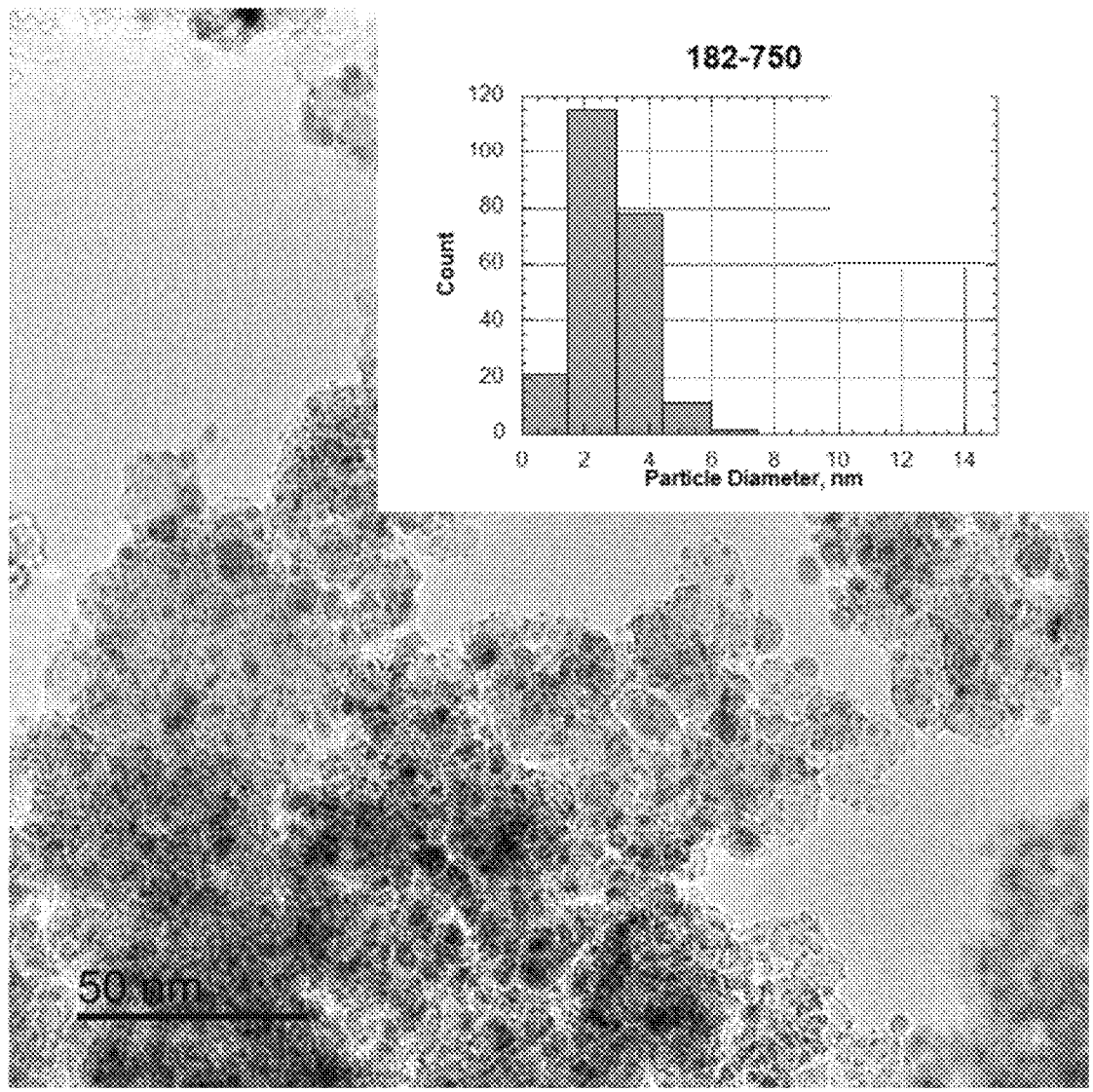
FIG. 6 shows TEM micrographs of $CoMoC_x$ particles on additional intermediate catalyst products.
Figure 7:
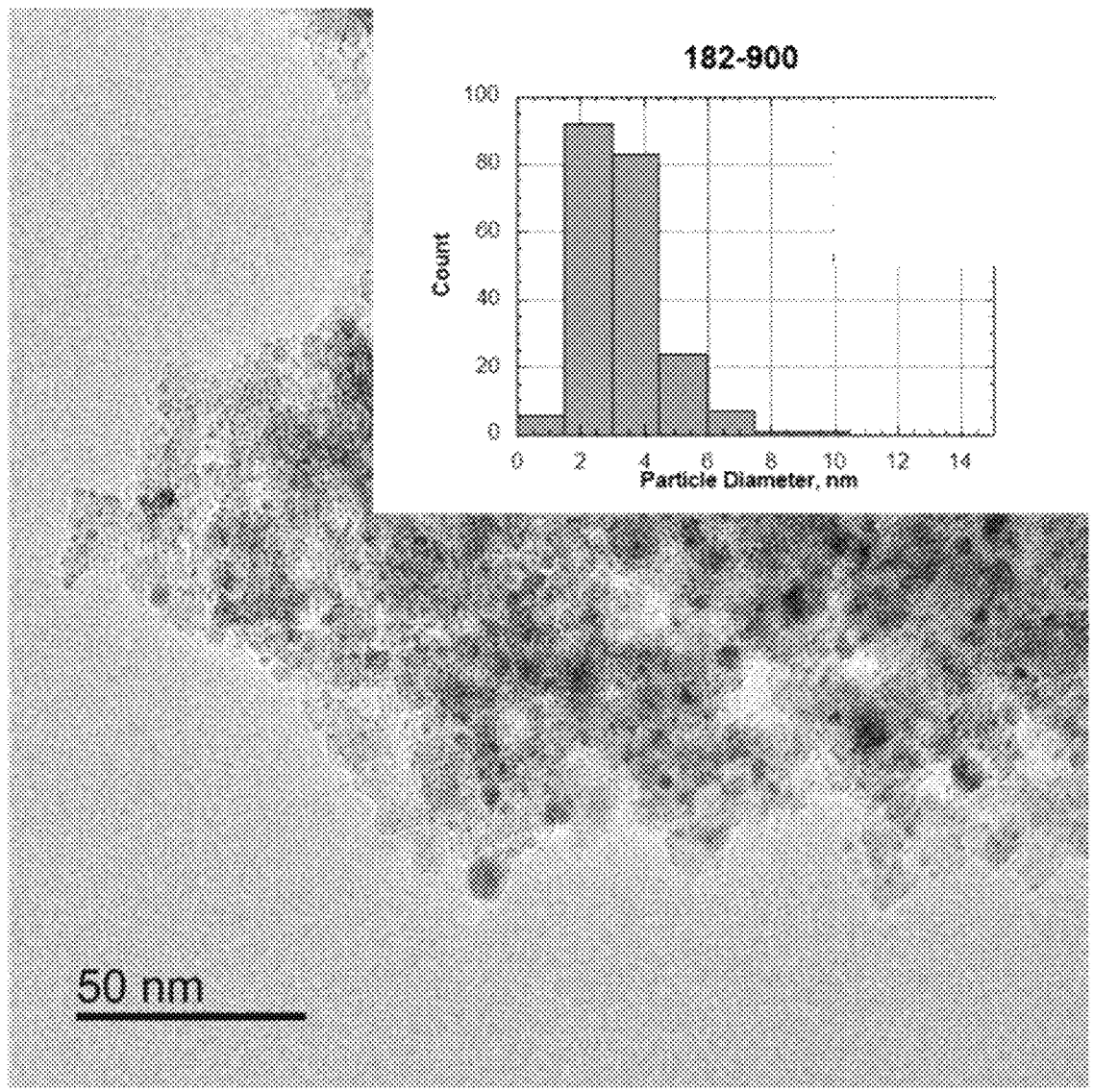
FIG. 7 shows TEM micrographs of $CoMoC_x$ particles on additional intermediate catalyst products.

FIG. 4, FIG. 5, FIG. 6, and FIG. 7 show additional TEM images of catalyst formed according to Examples 2-5. FIGS. 4-7 also include histograms showing the particle sizes of the particles identified in the TEM images. As shown in FIG. 4 (Example 2), FIG. 5 (Example 3), FIG. 6 (Example 4), and FIG. 7 (Example 5), as the temperature of the initial heating step is increased, the distribution of particle sizes shifts to larger values. At a temperature of 450° C. for the initial heating step (FIG. 4), the shift in particle sizes is relatively small, with most particles still having a particle size of less than 1.5 nm. However, at temperatures of 600° C. and higher (FIG. 5, FIG. 6, FIG. 7), a majority of the particles have particle sizes of greater than 1.5 nm in size. It is believed that this increase in particle size at higher temperatures in the initial heating steps contributes to the difference in catalyst activity for catalysts with an initial heating step temperature of less than 550° C. (or less than 500° C.) versus greater than 550° C. (or greater than 500° C.).

Figure 8:
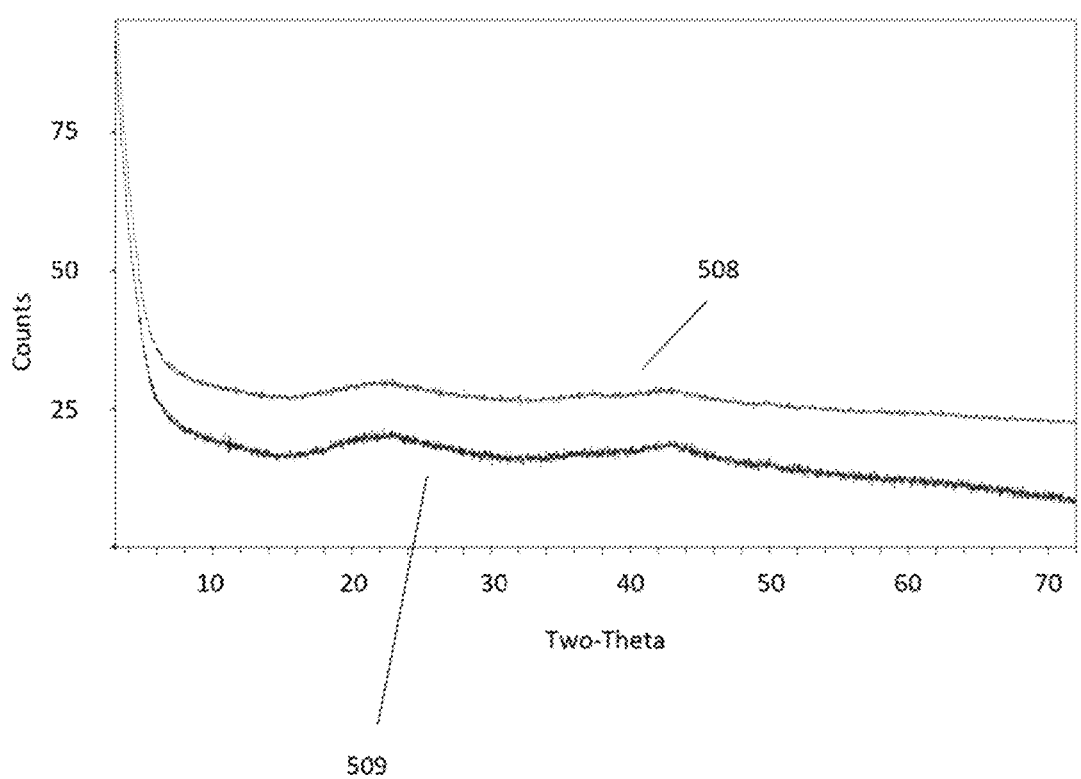
FIG. 8 shows XRD plots of additional intermediate catalyst products.

FIG. 8 shows XRD patterns for the catalyst from Example 8 (pattern 508) and the catalyst from Example 9 (pattern 509). As shown in FIG. 8, the XRD patterns show that the catalysts from Example 8 and Example 9 correspond to a similar material.

Example 12—Preparation of Reference Catalysts

In order to allow for testing of materials for hydroprocessing activities, two additional reference catalysts were synthesized. One reference catalyst (Reference Catalyst 1) corresponded to a supported CoMo catalyst formed by adding an organic compound prior to the initial heating step, but without addition of a secondary organic compound after the initial heating step. The second reference catalyst (Reference Catalyst 2) corresponded to a high activity bulk CoMo catalyst. Conventionally, a high activity bulk catalyst would be expected to provide superior activity to a supported catalyst, but with a substantially higher cost for providing a full catalyst load in a reactor.

Reference Catalyst 1 was formed by adding 2.95 g cobalt carbonate and 3.60 g molybdenum oxide to 25.5 ml water, followed by the addition of 4.5 g ethylenediamine (en) to the solution. This solution was added to 25 g of Davisil 646 $SiO_2$ dried at 100° C., via incipient wetness, to achieve a target metal oxide loading of 6.14 wt % CoO and 11.8 wt % $MoO_3$. The impregnate was spread in a thin layer to dry at 100° C. overnight. Next, 7.06 g oleic acid was added to heptane to form 18 ml of solution. The oleic acid in heptane solution was added to the impregnate, then dried again at 100° C. Samples with oleic acid were then heated at 3° C./min to 750° C. under $N_2$ in the tube furnace and held at that temperature for 2 hours, and the furnace was then shut off and cooled to room temperature under $N_2$. The tube furnace was then purged with a diluted stream of $O_2$ in He before samples were extracted. Co to Mo to en to ol ac ratio is kept at 1 to 1 to 3 to 1 in this prep.

Reference Catalyst 2 was formed by adding 3.006 g Alfa Chemical's 99.0% grade $CoCO_3$ and 1.815 g Sigma Aldrich $MoO_3$ to 150 ml water. The resulting solution was heated to 100° C. and aged for 4 hours. The solution was then filtered and the filtrate product was spread in a thin layer to dry at 100° C. overnight. Final elemental analysis on solid powder indicate Co to Mo ratio as Co1.62Mo1, hence 45.5 wt % CoO and 54.5 wt % $MoO_3$, and B.E.T. surface is 140 $m^2/g$.

Example 13—Materials Testing Comparison

The catalysts described above were tested for hydrotreatment activity under low pressure hydrotreatment conditions, such as at pressures of 150 psig to 1000 psig (~1.0 MPa-g to 6.9 MPa-g). Performing hydrotreatment under low pressure conditions can be beneficial for reducing or minimizing costs associated with hydrogen. First, low pressure hydrotreatment can reduce or minimize the amount of aromatic saturation that is performed during hydrotreatment. If the goal of hydrotreatment is primarily focused on reducing sulfur and/or nitrogen levels in a feed, reducing or minimizing aromatic saturation can reduce the amount of hydrogen that is needed. It is noted that saturation of an aromatic ring typically requires 6 hydrogen atoms per ring, while hydrodesulfurization or hydrodenitrogenation requires only 1 or 2 hydrogen atoms per S or N (depending on the reaction mechanism). As a result, incidental aromatic saturation can correspond to a substantial portion of the total hydrogen consumption during a hydrotreatment process. An additional advantage of low pressure hydrotreatment is that less compression of hydrogen is required. Hydrogen is known as a difficult/expensive gas to compress, so reducing or minimizing the amount of compression required for the hydrogen treat gas can provide cost savings based on the type and size of equipment needed for the hydrotreatment reactor.

For testing of catalysts for hydrodesulfurization and/or hydrodenitrogenation activity, two types of feeds were used. Feed 1 corresponded to a distillate fraction, with a T10 distillation point of roughly 200° C. and a T90 distillation point of roughly 360° C. Feed 1 had a sulfur content of 1.26 wt %, a nitrogen content of 192 wppm, and an API gravity of 33.9. Feed 2 corresponded to a straight run diesel fraction, with a T10 distillation point of roughly 265° C. and a T90 distillation point of roughly 380° C. Feed 2 had a sulfur content of 0.77 wt %, a nitrogen content of 176 wppm, and an API gravity of 35.0. It is further noted that Feed 2 was believed to have a naphthenes content of roughly 40 wt %, an aromatics content of roughly 30 wt %, and a paraffins content of roughly 30 wt %.

To test the various catalysts for activity in the presence of Feed 1 or Feed 2, the powder catalysts were first formed into particles. Each of the powder catalysts was pelletized in a hydraulic press at 15,000 psi for 3 minutes, then crushed and sieved to 35/60 mesh. 3.0 $cm^3$ of the sized chips were mixed with 3.0 $cm^3$ of 35/60 mesh Davisil 646 $SiO_2$ to give a 1 to 1 catalyst to diluent ratio by volume. This catalyst and diluent mixture was then loaded into a stainless steel U-shaped reactor with quartz wool at the inlet, and quartz wool and a fritted glass disc at the outlet. The reactor was then loaded into a sandbath and run in upflow mode.

The charged reactors were pressure-tested with $N_2$ and then with $H_2$ at 600 psig (4.1 MPa-g) and 25° C. After pressure testing, while $H_2$ was flowed at 50 $cm^3$/min, the temperature was raised to 100° C. At 100° C., the pressure was maintained at 100 psig (690 kPa-g), $H_2$ flow was stopped, and a sulfiding feed (7.5 wt % of dimethyl disulfide dissolved in a diesel feed) flowing at 8 ml/hr was passed over each catalyst for 4 hours. Then, with the sulfiding feed continuing, 24 l/hr of $H_2$ (48 sccm per each reactor) was added to each reactor, and the pressure raised to 4.1 MPa-g. The temperature was then increased to 200° C. over 1.5 hours, and then to 235° C. over 2 hours. The reactor was held isothermal at 235° C. for 16 hours. Following the isothermal hold, the temperature was raised to 290° C. over a period of roughly 10 hours, then raised to 340° C. over 2 hours and held isothermal for roughly 10 hours. Depending on the run, the ramp rate and final hold time at temperature were varied by up to 1 hr. These steps completed the sulfiding of the catalyst to convert supported metal carbides to active phases of Co promoted $MoS_2$ dispersed on $SiO_2$ support.

After catalyst sulfidation, either Feed 1 or Feed 2 was exposed to the sulfided catalyst at constant treat gas ratio (1000 SCF/bbl, or ~170 $Nm^3/m^3$), constant temperature (~335° C.), with various pressures (150-600 psig, or ~1.0-~4.1 MPa-g)) and liquid hourly space velocities (LHSV of 0.5 or 1.0 $hr^{-1}$).

When comparing activities for the catalysts, hydrodenitrogenation activity was modeled as a first order reaction (1.0 reaction order), while hydrodesulfurization was modeled as having a reaction order of 1.3.

In a first series of tests, the catalysts from Examples 1-6, Comparative Example 7, and Reference Catalysts 1 and 2 were tested by exposing Feed 1 to the catalysts at a hydrogen pressure of either 300 psig (~2.1 MPa-g) or 600 psig (~4.1 MPa-g). Table 2 shows results from the testing at 300 psig (~2.1 MPa-g). In Table 2, "CBD" is the catalyst bulk density. As shown in Table 2, the activity of Reference Catalyst 1 was used to provide a baseline for comparison of the other catalysts. Thus, the relative volume activity (RVA), relative weight activity (RWA), and relative molar activity per Mo (RMA) for both hydrodesulfurization (HDS) and hydrodenitrogenation (HDN) for Reference Catalyst 1 were normalized to a value of 100. Reference Catalyst 2 corresponds to a CoMo bulk catalyst, which would be conventionally expected to have higher RVA and higher RMA values than a CoMo supported catalyst.

TABLE 2

Catalyst Activity Testing (Feed 1, 2.1 MPa-g, 335° C., LHSV 0.5 hr$^{-1}$)

| Catalyst | CBD g/cc | S ppm | N ppm | RVA HDS (n = 1.3) | RVA HDN (n = 1.0) | RWA HDS (n = 1.3) | RWA HDN (n = 1.0) | RMA HDS Per Mo (n = 1.3) | RMA HDN Per Mo (n = 1.0) |
|---|---|---|---|---|---|---|---|---|---|
| Ref Catalyst #1 | 0.51 | 658 | 136 | 100 | 100 | 100 | 100 | 100 | 100 |
| Ref Catalyst #2 | 1.16 | 156 | 40 | 192 | 455 | 84 | 200 | 18 | 43 |
| Catalyst 1 | 0.98 | 94 | 49 | 235 | 396 | 122 | 206 | 51 | 86 |
| Catalyst 2 | 0.99 | 103 | 52 | 227 | 379 | 117 | 195 | 49 | 82 |
| Catalyst 3 | 0.95 | 137 | 70 | 202 | 293 | 108 | 157 | 45 | 66 |
| Catalyst 4 | 0.96 | 215 | 89 | 168 | 223 | 89 | 120 | 37 | 50 |
| Catalyst 5 | 0.98 | 231 | 93 | 163 | 210 | 85 | 91 | 36 | 38 |
| Comp Ex 7 | 1.04 | 200 | 65 | 173 | 314 | 85 | 154 | 36 | 64 |
| Catalyst 6 | 0.89 | 281 | 96 | 150 | 201 | 86 | 115 | 37 | 48 |

As shown in Table 2, the catalysts corresponding to Examples 1 and 2 both provided unexpectedly high RVA values for both HDS and HDN activity. In fact, Examples 1 and 2 both provided higher RVA values for HDS than the bulk catalyst (Reference Catalyst 2). Additionally, Examples 1 and 2 both provided the highest RVA values for any of the supported catalysts that were tested. It is unexpected for a supported hydrotreating catalyst to provide comparable or better RVA values for hydrotreating in comparison with a bulk catalyst when both the supported catalyst and the bulk catalyst are based on the same catalytic metals. Examples 1 and 2 also provide the comparable or better RWA values. With regard to RMA values, it is noted that Reference Catalyst 1 is a relatively low metal content catalyst, so it is not surprising that all of the other high metal catalysts had lower RMA values than Reference Catalyst 1. However, Examples 1 and 2 provided the highest RMA values for any of the high metal content catalysts shown in Table 2.

Table 2 also shows that hydroquinone performed similarly to stearyl amine as a secondary organic compound. Although the catalysts in Example 4 and Example 6 were formed using an initial heating step at 750° C., Table 2 shows that Example 4 and Example 6 have comparable activity values, with stearyl amine possibly having an advantage when comparing RVA values.

It is further noted that during the initial attempt to synthesize the catalyst from Example 2, a small amount of air was introduced into the heating chamber prior to the initial heating step, so that oxygen was present during the initial heating. This "oxidized" version of the catalyst from Example 2 was also tested for relative volume activity under the conditions used for Table 2. The "oxidized" version of the catalyst from Example 2 had RVA values that were less than half of the RVA values for Example 2 as shown in Table 2. This demonstrates the importance of maintaining a substantially oxygen free environment during the initial heating step.

Table 3 shows similar results of testing of the catalysts from Examples 1-6, Comparative Example 7, and Reference Catalysts 1 and 2 for processing of Feed 1 at a pressure of 4.1 MPa-g instead of 2.1 MPa-g. The LHSV was also increased to 1.0 h$^{-1}$.

TABLE 3

Catalyst Activity Testing (Feed 1, 4.1 MPa-g, 335° C., LHSV 1.0 hr$^{-1}$)

| Catalyst | CBD g/cc | S ppm | N ppm | RVA HDS (n = 1.3) | RVA HDN (n = 1.0) | RWA HDS (n = 1.3) | RWA HDN (n = 1.0) | RMA HDS Per Mo (n = 1.3) | RMA HDN Per Mo (n = 1.0) |
|---|---|---|---|---|---|---|---|---|---|
| Ref Catalyst #1 | 0.51 | 531 | 69 | 100 | 100 | 100 | 100 | 100 | 100 |
| Ref Catalyst #2 | 1.16 | 249 | 12 | 142 | 271 | 62 | 119 | 13 | 26 |
| Catalyst 1 | 0.98 | 126 | 11 | 188 | 279 | 98 | 145 | 41 | 61 |
| Catalyst 2 | 0.99 | 161 | 13 | 170 | 263 | 88 | 135 | 37 | 56 |
| Catalyst 3 | 0.95 | 228 | 28 | 147 | 188 | 79 | 100 | 33 | 42 |
| Catalyst 4 | 0.96 | 399 | 48 | 115 | 136 | 61 | 72 | 25 | 30 |
| Catalyst 5 | 0.98 | 405 | 48 | 114 | 136 | 59 | 71 | 25 | 30 |
| Comp Ex 7 | 1.04 | 276 | 20 | 135 | 221 | 66 | 108 | 28 | 45 |
| Catalyst 6 | 0.89 | 557 | 61 | 98 | 112 | 56 | 56 | 23 | 23 |

As shown in Table 3, the catalysts from Examples 1 and 2 provided the highest RVA, RWA, and RMA values of all of the high metal content supported catalysts. Additionally, the RVA, RWA, and RMA values for Examples 1 and 2 were again comparable to or higher than the corresponding activity values for the bulk catalyst (Reference Catalyst 2). This demonstrates that Examples 1 and 2, formed using an initial heating step at a temperature of 250° C. to 500° C. followed by deposition of a secondary organic compound, provided unexpectedly beneficial hydrotreating activities across a broad range of low pressure processing conditions.

Figure 9:
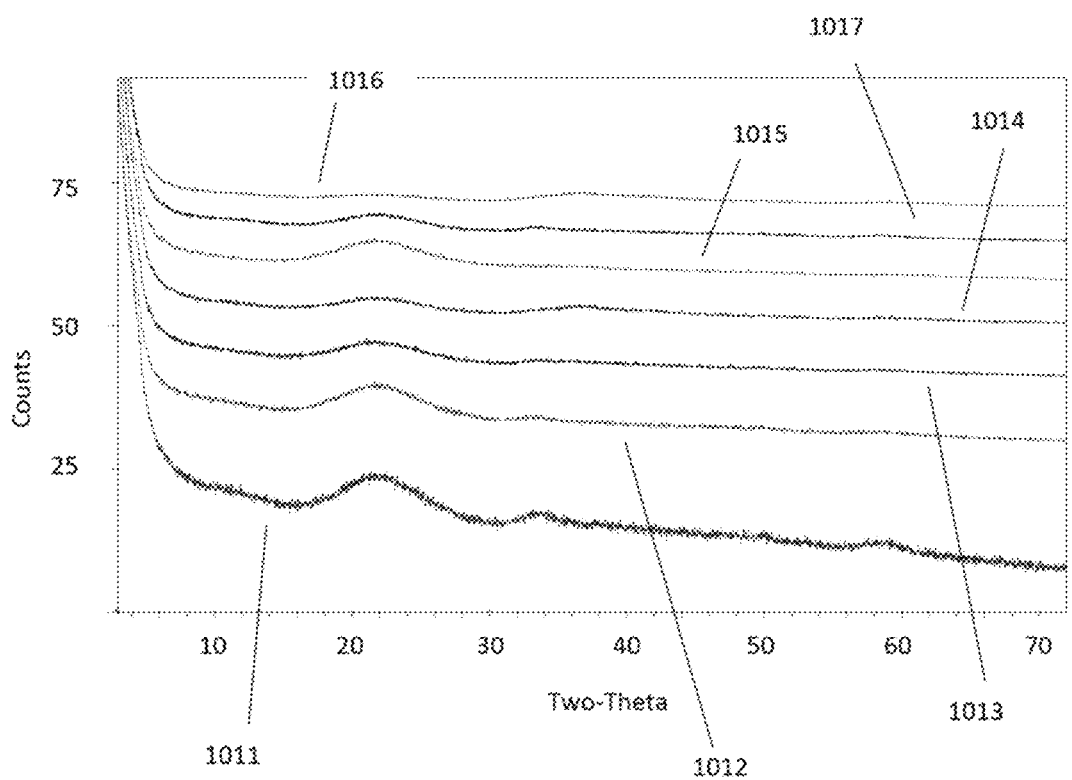
FIG. 9 shows XRD plots for spent sulfided catalysts.

After testing, the sulfided catalyst samples used for determining relative activities at 300 psig were also analyzed using XRD. FIG. 9 shows the XRD plots for the catalysts from Examples 1-6 (1011 to 1016, respectively) and Comparative Example 7 (1017). Due to the stable catalyst behavior throughout the runs shown in Table 2 and Table 3, it is believed that the spent sulfided catalyst is representative of the active catalyst after sulfidation. As shown in FIG. 9, the XRD plots from the spent sulfided catalyst show that the active phase is well-dispersed $MoS_2$ on support, with no resolvable peaks from crystalline triganol $MoS_2$ or detrital $Co_9S_8$ phases. Since the activity test runs were relatively stable, it is believed that the plots shown in FIG. 9 are representative of the actual active phase.

Table 4 shows results for testing of additional catalysts using Feed 2 as the feedstock at a pressure of 2.1 MPa-g. Table 4, the catalyst from Comparative Example 10 is used as the baseline catalyst. Table 4 also shows RVA, RWA, and RMA values for Reference Catalyst 2, Example 4, Example 8, and Example 9.

TABLE 4

Catalyst Activity Testing (Feed 2, 2.1 MPa-g, 335° C., LHSV 0.5 $hr^{-1}$)

| Catalyst | CBD g/cc | S ppm | N ppm | RVA HDS (n = 1.3) | RVA HDN (n = 1.0) | RWA HDS (n = 1.3) | RWA HDN (n = 1.0) | RMA HDS Per Mo (n = 1.3) | RMA HDN Per Mo (n = 1.0) |
|---|---|---|---|---|---|---|---|---|---|
| Comp Ex 10 | 1.03 | 501 | 121 | 100 | 100 | 100 | 100 | 100 | 100 |
| Ref Catalyst #2 | 1.16 | 92 | 33 | 219 | 402 | 194 | 357 | 59 | 108 |
| Catalyst 4 | 0.94 | 189 | 91 | 161 | 166 | 176 | 182 | 103 | 107 |
| Catalyst 8 | 0.92 | 329 | 114 | 124 | 114 | 139 | 128 | 142 | 131 |
| Catalyst 9 | 0.93 | 333 | 105 | 123 | 133 | 136 | 147 | 136 | 147 |

As shown in Table 4, the activity values (RVA, RWA, and RMA) for Example 8 and Example 9 are all higher than Comparative Example 10. This shows that even using an initial heating step that includes a temperature of 750° C., an activity benefit can be gained by adding a secondary organic compound to a catalyst. However, because of the increase in the size of the metal carbide particles due to heating at 750° C., Examples 8 and 9 do not achieve RVA or RWA values that are comparable to the activity of the bulk catalyst (Reference Catalyst 2).

Table 5 shows similar results for hydrotreatment of Feed 2 at a pressure of 4.1 MPa-g. As shown in Table 5, testing at the higher pressure resulted in similar trends for the RVA, RWA, and RMA values.

TABLE 5

Catalyst Activity Testing (Feed 2, 4.1 MPa-g, 335° C., LHSV 1.0 $hr^{-1}$)

| Catalyst | CBD g/cc | S ppm | N ppm | RVA HDS (n = 1.3) | RVA HDN (n = 1.0) | RWA HDS (n = 1.3) | RWA HDN (n = 1.0) | RMA HDS Per Mo (n = 1.3) | RMA HDN Per Mo (n = 1.0) |
|---|---|---|---|---|---|---|---|---|---|
| Comp Ex 10 | 1.03 | 726 | 87 | 100 | 100 | 100 | 100 | 100 | 100 |
| Ref Catalyst #2 | 1.16 | 99 | 5 | 282 | 476 | 233 | 423 | 71 | 129 |
| Catalyst 4 | 0.94 | 283 | 46 | 165 | 184 | 181 | 202 | 106 | 119 |
| Catalyst 8 | 0.92 | 501 | 74 | 123 | 121 | 138 | 135 | 141 | 138 |
| Catalyst 9 | 0.93 | 527 | 75 | 120 | 120 | 133 | 133 | 133 | 133 |

Additonal Embodiments

Embodiment 1. A method for making a catalyst, comprising: depositing a precursor comprising a Group 6 metal, a precursor comprising a Group 9 or Group 10 metal, an acid or a base, and a first organic compound on a support material to form a catalyst precursor; heating the catalyst precursor to a temperature of 250° C. to 1000° C. in the presence of 20 vppm $O_2$ or less to form an intermediate catalyst product having a pore volume of 0.10 cm³/g or higher; and depositing a secondary organic compound having a boiling point of 250° C. or higher on the intermediate catalyst product to form a catalyst, the secondary organic compound comprising an alcohol, an amine or a combination thereof.

Embodiment 2. The method of Embodiment 1, wherein a molar ratio of the secondary organic product to combined metals on the catalyst is 0.05 to 1.0.

Embodiment 3. The method of any of the above embodiments, further comprising sulfiding the catalyst to form a sulfided catalyst, wherein sulfiding the catalyst comprises exposing the catalyst to a sulfur-containing compound at a temperature of 250° C. or less.

Embodiment 4. The method of any of the above embodiments, wherein the catalyst precursor is heated to a temperature of 250° C. to 550° C., or wherein the catalyst precursor is heated to a temperature of 250° C. to 500° C.

Embodiment 5. The method of Embodiment 4, wherein the catalyst precursor is not exposed to a temperature of greater than 550° C., or wherein the intermediate catalyst product is not exposed to a temperature of greater than 550° C., or a combination thereof.

Embodiment 6. The method of any of the above embodiments, wherein the intermediate catalyst product comprises a pore volume of 0.1 cm³/g to 0.6 cm³/g.

Embodiment 7. The method of any of the above embodiments, wherein the Group 6 metal is Mo and wherein the Group 9 or Group 10 metal is Co.

Embodiment 8. The method of any of the above embodiments, wherein the intermediate catalyst product comprises a molar ratio of Co to Mo of 0.1 to 1.2, and wherein the intermediate catalyst product comprises 6.0 wt % to 40 wt % Mo, determined as a weight of metal oxide, relative to a weight of the intermediate catalyst product, the intermediate catalyst product optionally comprising 1.0 wt % to 15 wt % Co, determined as a weight of metal oxide, relative to a weight of the intermediate catalyst product.

Embodiment 9. The method of any of the above embodiments, wherein the first organic compound comprises at least one of an amine and a carboxylic acid, and i) wherein the depositing comprises depositing an acid, and wherein the first organic compound comprises an amine, or ii) wherein the depositing comprises depositing a base, and wherein the first organic compound comprises a carboxylic acid.

Embodiment 10. The method of any of the above embodiments, wherein the secondary organic compound comprises a primary amine, a secondary amine, or a combination thereof.

Embodiment 11. The method of any of the above embodiments, wherein heating the catalyst precursor comprises heating the catalyst precursor in the presence of substantially no $O_2$.

Embodiment 12. A catalyst made according to the method of any of Embodiments 1-11.

Embodiment 13. A composition, comprising: a support material; a carbide particle phase comprising cobalt and molybdenum, the carbide particle phase supported on the support material, the composition comprising a molar ratio of Co to Mo of 0.1 to 1.2, the composition comprising 6.0 wt % to 40 wt % Mo, determined as a weight of metal oxide, relative to a weight of the composition, the composition comprising a pore volume of 0.1 cm³/g to 0.6 cm³/g, wherein the composition optionally further comprises 1.0 wt % to 15 wt % Co, determined as a weight of metal oxide, relative to a weight of the composition.

Embodiment 14. The composition of Embodiment 13, wherein 50% or more by number of particles in the carbide particle phase comprise a particle size of 1.5 nm or less as determined by transmission electron microscopy.

Embodiment 15. The composition of Embodiment 13 or 14, wherein the composition further comprises a secondary organic compound having a boiling point of 250° C. or higher, the secondary organic compound comprising an alcohol, an amine, or a combination thereof, wherein a molar ratio of the secondary organic product to combined Co and Mo on the composition is 0.05 to 1.0.

Additional Embodiment A. An intermediate catalyst product made according to the method of any of Embodiments 1-11.

Additional Embodiment B. The method or composition of any of the above Embodiments, wherein the support material comprises silica ($SiO_2$), alumina ($Al_2O_3$), aluminosilicate, magnesia, titania, tungsten oxide ($WO_3$), zirconium oxide ($ZrO_2$), tungsten oxide/zirconium oxide ($WO_3/ZrO_2$), acidic clay, silicoaluminophosphate (SAPO), or a combination thereof.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for making a catalyst, comprising:
   depositing a precursor comprising a Group 6 metal, a precursor comprising a Group 9 or Group 10 metal, an acid or a base, and a first organic compound on a support material to form a catalyst precursor;
   heating the catalyst precursor to a temperature of 250° C. to 1000° C. in an atmosphere having an oxygen content of 20 vppm $O_2$ or less during the heating to form an intermediate catalyst product comprising metal carbides of at least one of the Group 6 metal and the Group 9 or Group 10 metal, the intermediate catalyst product having a pore volume of 0.10 cm³/g or higher; and
   depositing a secondary organic compound, different from the acid or the base and the first organic compound, and having a boiling point of 250° C. or higher on the intermediate catalyst product to form a catalyst, the secondary organic compound comprising an alcohol, an amine or a combination thereof.

2. The method of claim 1, further comprising sulfiding the catalyst.

3. The method of claim 2, wherein sulfiding the catalyst comprises exposing the catalyst to a sulfur-containing compound at a temperature of 250° C. or less.

4. The method of claim 1, wherein the catalyst precursor is heated to a temperature of 250° C. to 550° C.

5. The method of claim 4, wherein the catalyst precursor is not exposed to a temperature of greater than 550° C., or wherein the intermediate catalyst product is not exposed to a temperature of greater than 550° C., or a combination thereof.

6. The method of claim 4, wherein the intermediate catalyst product comprises a pore volume of 0.1 cm³/g to 0.6 cm³/g.

7. The method of claim 1, wherein the catalyst precursor is heated to a temperature of 250° C. to 500° C.

8. The method of claim 1, wherein the Group 6 metal is Mo and wherein the Group 9 or Group 10 metal is Co.

9. The method of claim 1, wherein the intermediate catalyst product comprises Co and Mo, the intermediate catalyst product comprising a molar ratio of Co to Mo of 0.1 to 1.2, and wherein the intermediate catalyst product comprises 6.0 wt % to 40 wt % Mo, determined as a weight of metal oxide, relative to a weight of the intermediate catalyst product.

10. The method of claim 9, wherein the intermediate catalyst product comprises 1.0 wt % to 15 wt % Co, determined as a weight of metal oxide, relative to a weight of the intermediate catalyst product.

11. The method of claim 1, wherein a molar ratio of the secondary organic product to combined metals on the catalyst is 0.05 to 1.0.

12. The method of claim 1, wherein the first organic compound comprises at least one of an amine and a carboxylic acid.

13. The method of claim 12, i) wherein the depositing comprises depositing an acid, and wherein the first organic compound comprises an amine, or ii) wherein the depositing comprises depositing a base, and wherein the first organic compound comprises a carboxylic acid.

14. The method of claim 1, wherein the secondary organic compound comprises a primary amine, a secondary amine, or a combination thereof.

15. The method of claim 1, wherein heating the catalyst precursor comprises heating the catalyst precursor in the presence of substantially no $O_2$.

* * * * *